US011256092B2

(12) United States Patent
Shamir et al.

(10) Patent No.: US 11,256,092 B2
(45) Date of Patent: Feb. 22, 2022

(54) BINOCULAR WIDE FIELD OF VIEW (WFOV) WEARABLE OPTICAL DISPLAY SYSTEM

(71) Applicant: EVERYSIGHT LTD., Haifa (IL)

(72) Inventors: Hanan Shamir, Haifa (IL); Sasson Abraham, Haifa (IL); Alla Zlochin, Haifa (IL); Asaf Ashkenazi, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 72 days.

(21) Appl. No.: 16/092,595

(22) PCT Filed: Apr. 10, 2017

(86) PCT No.: PCT/IL2017/050441
§ 371 (c)(1),
(2) Date: Oct. 10, 2018

(87) PCT Pub. No.: WO2017/179054
PCT Pub. Date: Oct. 19, 2017

(65) Prior Publication Data
US 2019/0121132 A1     Apr. 25, 2019

Related U.S. Application Data

(60) Provisional application No. 62/320,543, filed on Apr. 10, 2016.

(51) Int. Cl.
*G02B 27/01* (2006.01)
*G02B 5/10* (2006.01)
(Continued)

(52) U.S. Cl.
CPC .......... *G02B 27/0172* (2013.01); *G02B 5/10* (2013.01); *G02B 7/021* (2013.01);
(Continued)

(58) Field of Classification Search
CPC ....... G06F 3/048; G02B 27/0172; G02B 5/10; G02B 7/021; G02B 1/18; G02B 2027/0178; G02B 3/011
See application file for complete search history.

(56) References Cited

U.S. PATENT DOCUMENTS 4,806,011 A    2/1989 Bettinger
8,866,702 B1 * 10/2014 Wong .................... G06F 1/163
                                                    345/7

(Continued)

FOREIGN PATENT DOCUMENTS

CN       103293676 A    9/2013
WO       2016135757     9/2016

OTHER PUBLICATIONS

European Office Action dated May 13, 2020, for corresponding European Application No. 17782055.2; (7 pages).

(Continued)

*Primary Examiner* — Stephen G Sherman
(74) *Attorney, Agent, or Firm* — K&L Gates LLP

(57) ABSTRACT

A wearable optical display system comprising: a user attachment section; a partially transmissive partially reflective optical part, coupled with said user attachment section, and configured to be facing an eye of said user; and an electro-optical unit, coupled with at least one of said user attachment section and said partially transmissive partially reflective optical part, said electro-optical unit comprising: a plurality of lenses; a plurality of reflectors having a nose-positioned reflector being positioned at a side of a nose of said user, such to allow an unobstructed field of regard to said eye; and a light projection unit for projecting light beams onto said partially transmissive partially reflective optical part via said at least one nose-positioned reflector being interposed along an optical path between said light projection unit and
(Continued)

partially transmissive partially reflective optical part, for viewing at least part of a projection of said light beams by said eye.

17 Claims, 12 Drawing Sheets

(51) Int. Cl.
  G02B 7/02 (2021.01)
  G02B 27/09 (2006.01)
  G06F 3/048 (2013.01)
  G02B 1/18 (2015.01)
(52) U.S. Cl.
  CPC ..... *G02B 27/0972* (2013.01); *G02B 27/0977* (2013.01); *G06F 3/048* (2013.01); *G02B 1/18* (2015.01); *G02B 2027/0178* (2013.01)

(56) References Cited

U.S. PATENT DOCUMENTS

| | | | |
|---|---|---|---|
| 2008/0002262 A1* | 1/2008 | Chirieleison | G02B 27/0093 359/630 |
| 2013/0222214 A1* | 8/2013 | Takeda | G02B 5/18 345/8 |
| 2015/0168730 A1 | 6/2015 | Ashkenazi et al. | |
| 2015/0338653 A1 | 11/2015 | Subramaniam et al. | |
| 2016/0025978 A1* | 1/2016 | Mallinson | G02B 27/0172 345/8 |

OTHER PUBLICATIONS

Office action and search report dated Jul. 24, 2020 (11p) in corresponding CN application No. 2017800284471.
International Search Report for PCT/IL2017/050441 dated Aug. 6, 2017.
Written Opinion of the International Searching Authority for PCT/IL2017/050441 dated Aug. 6, 2017.

* cited by examiner

US 11,256,092 B2

BINOCULAR WIDE FIELD OF VIEW (WFOV) WEARABLE OPTICAL DISPLAY SYSTEM

FIELD OF THE DISCLOSED TECHNIQUE

The disclosed technique relates to optical systems in general and optical near-eye display systems in particular.

BACKGROUND OF THE DISCLOSED TECHNIQUE

Optical wearable display systems have been introduced into the civil market more than 20 years ago. Most applications of wearable display systems targeted the industrial domain. During the last decade, several new wearable display systems were introduced into the market, targeting the entertainment and gaming fields (e.g., Magic Leap®, Microsoft®, Vuzix®, Epson®, Sony®, Lumus®, and others), typically equipped with a binocular optical system delivering a field of view of around 40 degrees. Optical solutions to existing wearable display systems introduced into the market are typically characterized by an optical element (e.g., a special window, a prism or a light guide) positioned in front of a user's eyes, which is used for directing and guiding the light from the display toward the eye of the user. One can appreciate that the positioning of such an element in front of the eyes of the user introduces obstructions, optical distortions, and residual artifacts (e.g., prismatic deviation, reflections, ghosts, etc.), and may further cause safety issues with respect to impact resistance (e.g., concerning safety standards for eye wear devices). Apart from being a functional article that presents images to the user, the eyewear device may also be considered as a fashionable article (e.g., a stylish accessory).

One solution for mitigating obstructions to a user's field of regard (FOR) when wearing a head-worn optical see-through display system is disclosed in PCT patent application publication no.: WO 2016/135757 to Ashkenazi and Shamir entitled "Wearable Optical Display System for Unobstructed Viewing". The wearable optical display system includes a user attachment section, a partially transmissive partially reflective lens, and an electro-optical unit. The user attachment section is for detachably mounting the user wearable optical display system to a head of a user. The partially transmissive partially reflective lens, which is coupled with the user attachment section, is configured to be facing at least one eye of the user. The electro-optical unit is coupled with at least one of the user attachment section and the partially transmissive partially reflective lens. The electro-optical unit includes a processor, and a light projection unit. The processor is coupled with the light projection unit. The light projection unit is configured to transmit light beams onto the partially transmissive partially reflective lens. The electro-optical unit is configured to be positioned with respect to the user attachment section such that when the user wearable optical display system is mounted on the user, the electro-optical unit is located at the glabellar region of the user.

BRIEF DESCRIPTION OF THE DRAWINGS

The disclosed technique will be understood and appreciated more fully from the following detailed description taken in conjunction with the drawings in which.

SUMMARY OF THE DISCLOSED TECHNIQUE

Figure 1A:
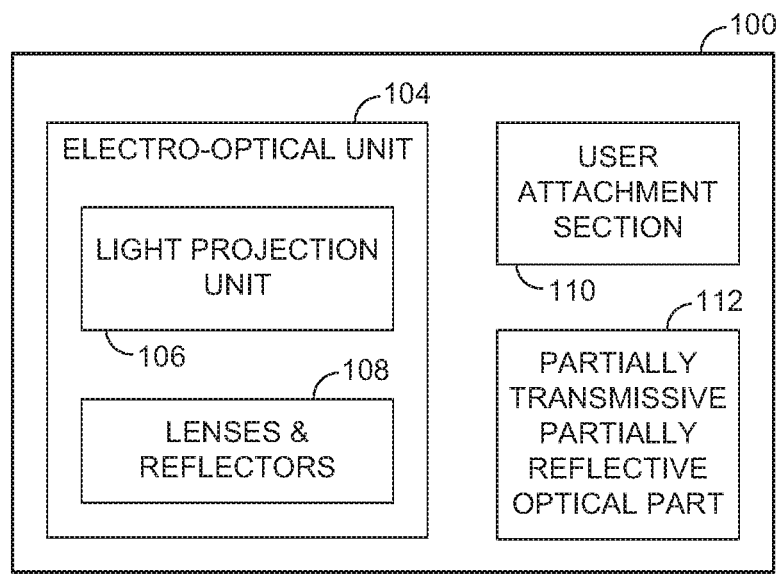
FIG. 1A is a schematic block diagram of a reduced configuration of an optical display system of the disclosed technique, constructed and operative in accordance with an embodiment of the disclosed technique.

It is an object of the disclosed technique to provide a novel user wearable optical display system that provides information in the form of projected light to a user who wears the optical system without obstructing the user's field of regard (FOR). The wearable optical display system includes a user attachment section, a partially transmissive partially reflective optical part, and an electro-optical unit. The user attachment section enables and is configured for detachably mounting the wearable optical display system to at least part of a head of the user. The partially transmissive partially reflective optical part (typically embodied in the form of glasses) is at least partly coupled with the user attachment section, and configured to be facing at least one eye of the user. The electro-optical unit is coupled with at least one of the user attachment section and the partially transmissive partially reflective optical part. The electro-optical unit includes a plurality of lenses and reflectors, and a light projection unit. There is at least one nose-positioned reflector configured to be positioned and orientated at a side of a nose of the user, at eye-level, such that it does not obstruct the user's field of regard (FOR). The light projection unit is configured and operative for projecting light beams onto the partially transmissive partially reflective optical part via the nose-positioned reflector being interposed along an optical path between the light projection unit and the partially transmissive partially reflective optical part, for viewing at least part of a projection of the light beams by at least one eye of the user. An expanded configuration (typical) of the optical display system further includes a processor, memory, user interface, and communication module. The processor is configured to be coupled with the electro-optical unit.

According to another aspect of the disclosed technique, there is thus provided a wearable optical display system that includes a partially transmissive partially reflective optical part, an electro-optical sub-system. The partially transmissive partially reflective optical part is configured to be facing at least one eye of the user. The electro-optical sub-system is configured to have a fixed position with respect to the partially transmissive partially reflective optical part. The electro-optical unit includes an image generator, a first reflector, a second reflector, a first lens, a second lens, a third lens, a fourth lens, and a fifth lens. The image generator is configured to generate and irradiate light beams. The image generator, the first and second reflectors, as well as the first, second, third, fourth, and fifth lenses are configured to be in fixed positions with respect to each other, so as to allow the light beams to travel an optical path sequentially through the fifth lens, the forth lens, the third lens, the second lens, then to reflect from the second reflector, then pass through the first lens, then reflect from the first reflector, and then to reflect from the partially transmissive partially reflective optical part toward at least one eye of the user. The first reflector is configured to be positioned at a side of the nose of the user, at eye-level, such to allow an unobstructed field of regard (FOR) to at least one eye. The partially transmissive partially reflective optical part is configured and constructed to be generally aspheric, and particularly to be take the form of an ellipsoid (i.e., ellipsoidal, having a surface that follows the curvature of a part of an ellipsoid). Partially transmissive partially reflective optical part 112 has a surface that follows the curvature of an ellipsoid that has at least two foci, such that at least one focus is configured coincide with a position of an eye (i.e., the pupil) of the user.

According to a further aspect of the disclosed technique, there is thus provided a wearable optical display system that includes a partially transmissive partially reflective optical part, an electro-optical sub-system. The partially transmissive partially reflective optical part is configured to be facing at least one eye of a user. The partially transmissive partially reflective optical part is ellipsoidal (i.e., in a form of part of an ellipsoid that has two foci), such that at least one focus is configured to coincide with a position of an eye of the user. The electro-optical unit includes a plurality of lenses, and a plurality of reflectors having at least one nose-positioned reflector being positioned at a side of a nose of the user, such to allow an unobstructed field of regard (FOR) to the at least one eye. The light projection unit is configured for projecting light beams onto the partially transmissive partially reflective optical part via the at least one nose-positioned reflector being interposed along an optical path between the light projection unit and the partially transmissive partially reflective optical part, for viewing at least part of a projection of the light beams by the at least one eye of the user.

DETAILED DESCRIPTION OF PREFERRED EMBODIMENTS

The disclosed technique overcomes the disadvantages of the prior art by providing a wearable optical display system providing either a monocular or a binocular wide field of view (WFOV) to a user. The wearable optical display system includes a user attachment section, a partially transmissive partially reflective optical part, and an electro-optical unit. The user attachment section enables and is configured for detachably mounting the wearable optical display system to at least part of a head of the user. The partially transmissive partially reflective optical part (typically embodied in the form of glasses) is at least partly coupled with the user attachment section, and configured to be facing at least one eye of the user. The electro-optical unit is coupled with at least one of the user attachment section and the partially transmissive partially reflective optical part. The electro-optical unit includes a plurality of lenses and reflectors, and a light projection unit. There is at least one nose-positioned reflector configured to be positioned and orientated at a side of a nose of the user, at eye-level, such that it does not obstruct the user's field of regard (FOR). The light projection unit is configured and operative for projecting light beams onto the partially transmissive partially reflective optical part via the nose-positioned reflector being interposed along an optical path between the light projection unit and the partially transmissive partially reflective optical part, for viewing at least part of a projection of the light beams by at least one eye of the user. An expanded configuration (typical) of the optical display system further includes a processor, memory, user interface, and communication module. The processor is configured to be coupled with the electro-optical unit.

According to another aspect of the disclosed technique, there is thus provided a wearable optical display system that includes a partially transmissive partially reflective optical part, an electro-optical sub-system. The partially transmissive partially reflective optical part is configured to be facing at least one eye of the user. The electro-optical sub-system is configured to have a fixed position with respect to the partially transmissive partially reflective optical part. The electro-optical unit includes an image generator, a first reflector, a second reflector, a first lens, a second lens, a third lens, a fourth lens, and a fifth lens. The image generator is configured to generate and irradiate light beams. The image generator, the first and second reflectors, as well as the first, second, third, fourth, and fifth lenses are configured to be in fixed positions with respect to each other, so as to allow light beams to travel an optical path sequentially through the fifth lens, the forth lens, the third lens, the second lens, then to reflect from the second reflector, then pass through the first lens, then reflect from the first reflector, and then to reflect from the partially transmissive partially reflective optical part toward at least one eye of the user. The first reflector is configured to be positioned at a side of the nose of the user, at eye-level, such to allow an unobstructed field of regard (FOR) to at least one eye. The partially transmissive partially reflective optical part is configured and constructed to be generally aspheric, and particularly to be take the form of an ellipsoid (i.e., ellipsoidal, having a surface that follows the curvature of a part of an ellipsoid). Partially transmissive partially reflective optical part 112 has a surface that follows the curvature of an ellipsoid that has at least two foci, such that at least one focus is configured to coincide with a position of an eye (i.e., the pupil) of the user.

The optical display is characterized as a non-pupil forming system, performing as an off-axis optical system in the horizontal direction, and an on-axis optical system in the vertical direction. To circumvent obstructions to the user's FOR the optical display system employs a vertical on-axis optical configuration and a horizontal off-axis optical configuration, in which the problem of optical aberrations typically inherent to off-axis optical system is solved by the unique optical design and configuration of the optical display system, while concurrently enabling comfortable accommodation (e.g., in terms of minimization of size, weight, fitting, user experience, etc.) to the user.

The wearable optical display system is typically embodied as an optical see-through (OST) display system. According to another configuration of the display system of the disclosed technique, there is thus provided a wearable optical display system that is optically opaque (i.e., not optically see-through). According to a further configuration of the optical display system of the disclosed technique, the partially transmissive partially reflective optical part of the optical display system is adjustable between intermediate levels of opacity between transparent and completely opaque.

The display system provides a novel solution for a compact binocular see-through wide field of view common visor projected near eye display system (also interchangeably denoted hereinafter "near-eye display system" or "near-eye see-through visor projected display system"). The near-eye display system is configured and operative for generating live imagery (e.g., images, video) overlaid coaxially with the user's line of sight and around the center of the user's field of regard (FOR). According to the disclosed technique, an on-board miniature computer (processor) is configured and operative to at least one of: generate, drive, and provide the live imagery to a power-efficient organic light emitting diode display (OLED) of the light projection unit that projects the imagery onto an inner surface of the partially transmissive partially reflective optical part ellipsoidal in shape (i.e., typically embodied in the form of ellipsoid shaped glasses ("visor") (i.e., part of the surface of an ellipsoid) coated with a semitransparent mirror (partially reflective, partially transmissive material) that reflects the image back towards each eye of the user, while concurrently allowing incoming light from an external scene to be viewed by the user.

The assembly structure of the optical projection unit is optically-mechanically designed, constructed and configured to fit with respect to position, orientation and size within the space above the nose and on both upper sides of the nose, at the most interior point of the forehead between the brow-ridges (*glabella*, also term interchangeably herein "glabellar region"), and the inner surface of the visor. The optical projection unit structure, according to one configuration, incorporates a built-in nosepiece adapter for holding a nosepiece that allows for precise and stabilized lateral positioning of the near-eye display system, against the user's eye position. According to another configuration, the optical projection unit structure is separate from the nosepiece adapter. To further elucidate the particulars of the disclosed technique reference is now made to FIGS. 1A and 1B.

Figure 1B:
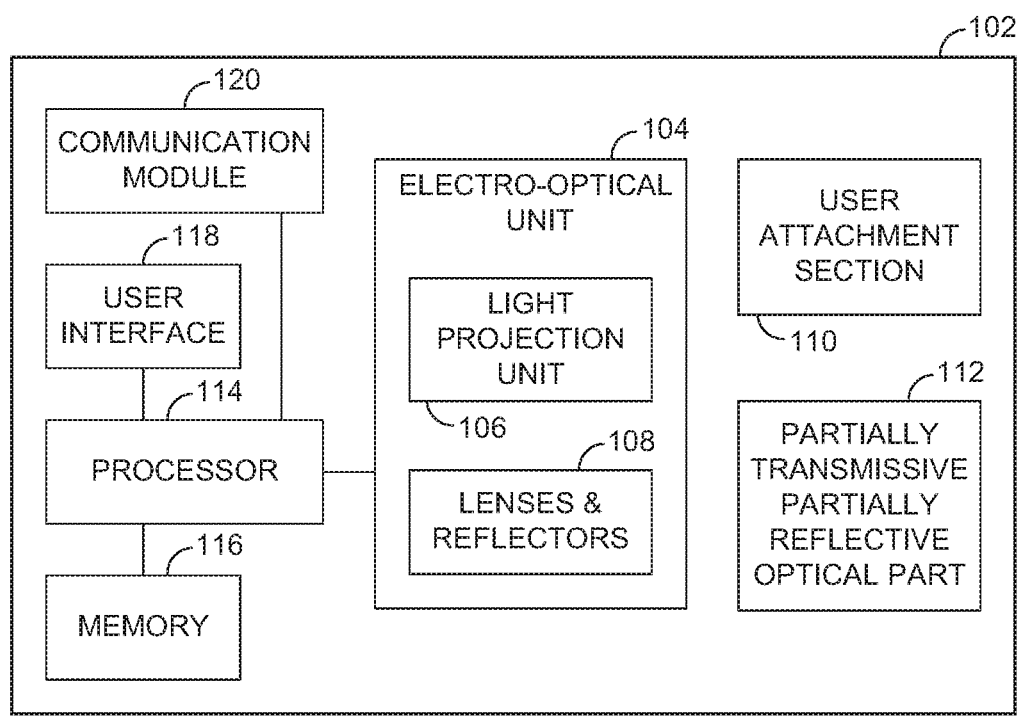
FIG. 1B is a schematic block diagram of an expanded configuration of the optical display system of FIG. 1A, constructed and operative in accordance with the embodiment of the disclosed technique.

FIG. 1A is a schematic block diagram of a reduced configuration of an optical display system of the disclosed technique, generally referenced 100, constructed and operative in accordance with an embodiment of the disclosed technique. FIG. 1B is a schematic block diagram of an expanded configuration of the optical display system of FIG. 1A, generally referenced 102, constructed and operative in accordance with the embodiment of the disclosed technique. Optical display systems 100 (FIG. 1A) and 102 (FIG. 1B) include an electro-optical unit 104, a user attachment section 110, and a partially transmissive partially reflective optical part 112. Electro-optical unit 104 includes a light projection unit 106 and lenses and reflectors 108. Electro-optical unit 104 is configured to be coupled with at least one of user attachment section 110 and partially transmissive partially reflective optical part 112. According to one coupling configuration, electro-optical unit 104 is mechanically coupled with user attachment section 110 and not with partially transmissive partially reflective optical part 112. According to another coupling configuration, electro-optical unit 104 is mechanically coupled with partially transmissive partially reflective optical part 112 and not with user attachment section 110. According to yet another coupling configuration, electro-optical unit 104 is mechanically coupled with both user attachment section 110 and partially transmissive partially reflective optical part 112.

User attachment section 110 is configured for detachably mounting optical display systems 100 and 102 to at least part of a head of a user. User attachment section 110 is typically embodied in the form of glasses. Alternatively, user attachment section 110 is embodied in the form of a sunglass frame, a strap, a flexible strap, a flexible adjustable strap, a headband, a headband incorporating apex crossing strap, a double strap, a strap incorporating chin strap, a headband with wireframe helmet configuration, a helmet, a hat, a nose spectacles, a clip-on type glasses, a clip-on type attachment, goggles, sport-related eyewear (e.g., ski head and eye wear), general eyewear, and a general head covering.

Partially transmissive partially reflective optical part 112 is configured to be facing at least one eye of the user on whom the optical display system (100, 102) is mounted. Lenses and reflectors 108 include at least one nose-positioned reflector being positioned at a side of a nose of the user (i.e., at eye-level, and not obstructing the user's field of regard (FOR)). Light projection unit 106 is configured for projecting light beams onto partially transmissive partially reflective optical part 112 via lenses and reflectors 108 including via the nose-positioned reflector being interposed along an optical path between light projection unit 106 and partially transmissive partially reflective optical part 112. Partially transmissive partially reflective optical part 112 is configured and operative to concurrently at least partially reflect the light (i.e., which is encoded with data or that contains information) toward the eyes of the user who wears the optical system, as well as to at least partially transmit incoming light from a scene in the user's field of regard (i.e., outward-facing environment with respect to the user). Partially transmissive partially reflective optical part 112 functions as an optically collimated transparent (or translucent) combiner enabling the overlay of images and other data projected onto its surfaces, without obstructing an external real-world scene viewed therethrough by the user. At least part of the light beams being projected from light projection unit 106 are intended for viewing by at least one eye of the user.

Light projection unit 106 is configured to receive data from an external source (not shown, e.g., a digital media player, a data storage device, peripheral devices, a computer network (e.g., Internet), etc.), according to one mode of operation, at least partially encode the received data into light encoded data (i.e., light containing information) (also denoted herein interchangeably as "light encoded information" or "light-encoded information"), and to project the light-encoded information in the form of a light representation (e.g., an image, graphical information, symbology, etc.) partially created from the received data. According to another mode of operation, light projection unit 106 is configured and operative to project light encoded data autonomously or self-reliantly (i.e., separately and independently from an external source), created from predetermined data (e.g., data from an internal memory thereof—not shown, data autonomously generated by light projection unit 106). According to a hybrid mode of operation, light projection unit 106 is configured and operative to use data at least partially from an external source as well as self-contained data (i.e., data generated and/or stored from within) so to create and project the light encoded data.

According to the expanded configuration (FIG. 1B), optical display system 102 further includes a processor 114, a memory 116, a user interface 118, and a communication module 120. Memory 116, user interface 118, and communication module 120 are each coupled with processor 114. Processor 114 is configured and operative to process, and generate data (not shown), for example in the form of electrical signals that contain image data and/or graphical representation data and to provide (i.e., generally communicate bi-directionally) this data to light projection unit 106. The data is typically stored, retrieved and may furthermore be manipulated and modified in memory device 116 that is generally embodied in the form of non-volatile memory (e.g., read-only memory (ROM), flash memory, magnetic storage devices (e.g., hard disks), ferroelectric read-only memory (F-RAM), optical memory (e.g., optical discs), etc.), as well as volatile memory (e.g., RAM).

Processor 114 may be embodied in the form of a miniature computing unit (MCU), multiple computing units whether centralized or distributed, as a single processor, as multiple processors, combinations thereof, and the like. Among other processing functions, processor 114 is configured and operative for controlling electro-optical unit 104, for generating data pertaining to the light encoded with information (e.g., images, video, etc.), for driving at least part of light projection unit 106 (e.g., an image generator), for receiving and retrieving data from memory 116, for receiving commands from and conveying information to user interface 118, and for receiving from and transmitting data to communication module 120. Processor 114 is further configured and operative to correct aberrations (e.g., geometrical distortions, chromatic aberrations, etc.) in at least one image formed by the light beams (projected by light projection unit 106) based on correction data (e.g., a distortion correction function, a distortion map, etc.). The distortion correction data corresponds to a specific optical configuration of optical display systems 100 and 102 and is typically predetermined and stored in memory 116).

According to the expanded configuration of FIG. 1B, light projection unit 106 is configured to receive image data from processor 114, and to generate, irradiate and project light encoded with information (e.g., an image, video, graphical representations, etc.). This light encoded information propagates via light beams. Lens and reflectors 108 are configured and operative to convey these light beams that contain the information (e.g., image data) toward an inner surface of partially transmissive partially reflective optical part 112 that is coated with a semitransparent reflective material that reflects at least part of the projected light beams toward at least one eye of the user (and at least partly transmits incoming light from an external environment to partially transmissive partially reflective optical part 112). Light projection unit 106 is configured to be positioned rigidly and accurately with respect to partially transmissive partially reflective optical part 112, and together they may be viewed as an integrated optical system that provides clear and sharp imagery that is projected onto a FOV at the center of the user's FOR.

User interface 118 is configured and operative to receive, transmit, and provide (e.g., present, display, generate sounds, etc.) input or data, respectively from and to (e.g., transmit, communicate, present an output) the user. User interface 118 generally enables interaction with the user and is preferably a human-machine interface (HMI) that may include graphical user interfaces (GUIs) (e.g., via touchscreens), tactile user interfaces (e.g., touchpads), voice user interfaces, gesture user interfaces, user-motion tracking interfaces, user-gaze tracking input interfaces, text-based user interfaces, non-command user interfaces (inferring user behavior), and the like. User interface 118 may be coupled with user attachment section 110. In addition, user interface 118 may include at least one microphone (not shown, e.g., for receiving sound (e.g., voice) commands), at least one loudspeaker (not shown, e.g., for generating sounds to be conveyed to the user, as well as to the user's surrounding environment), as well as at least one camera (not shown, e.g., for acquiring images and/or video of at least one hand of the user (e.g., so as to allow for gesture recognition through hand movements).

Communication module 120 is configured and operative to transmit and to receive data to-and-fro processor 114, as well as is enabled for communicating data ("external data") to-and-fro external devices (not shown). For example, communication module 120 may receive data to be first transformed into light representation data and then projected by light projection unit 106 onto partially transmissive partially reflective optical part 112. Communication module 120 is further configured and operative for communicating data ("auxiliary data") with auxiliary devices (also termed interchangeably herein "peripheral devices") (not shown), such as Global System for Mobile communication (GSM) cellular networks, Wi-Fi routers, computer servers, Bluetooth® enabled devices, Internet-enabled devices, and the like. At least part of the aforementioned auxiliary devices may be incorporated into the wearable display system (e.g., an integrated GPS module, an integrated Wi-Fi communication module, etc.).

Figure 2:
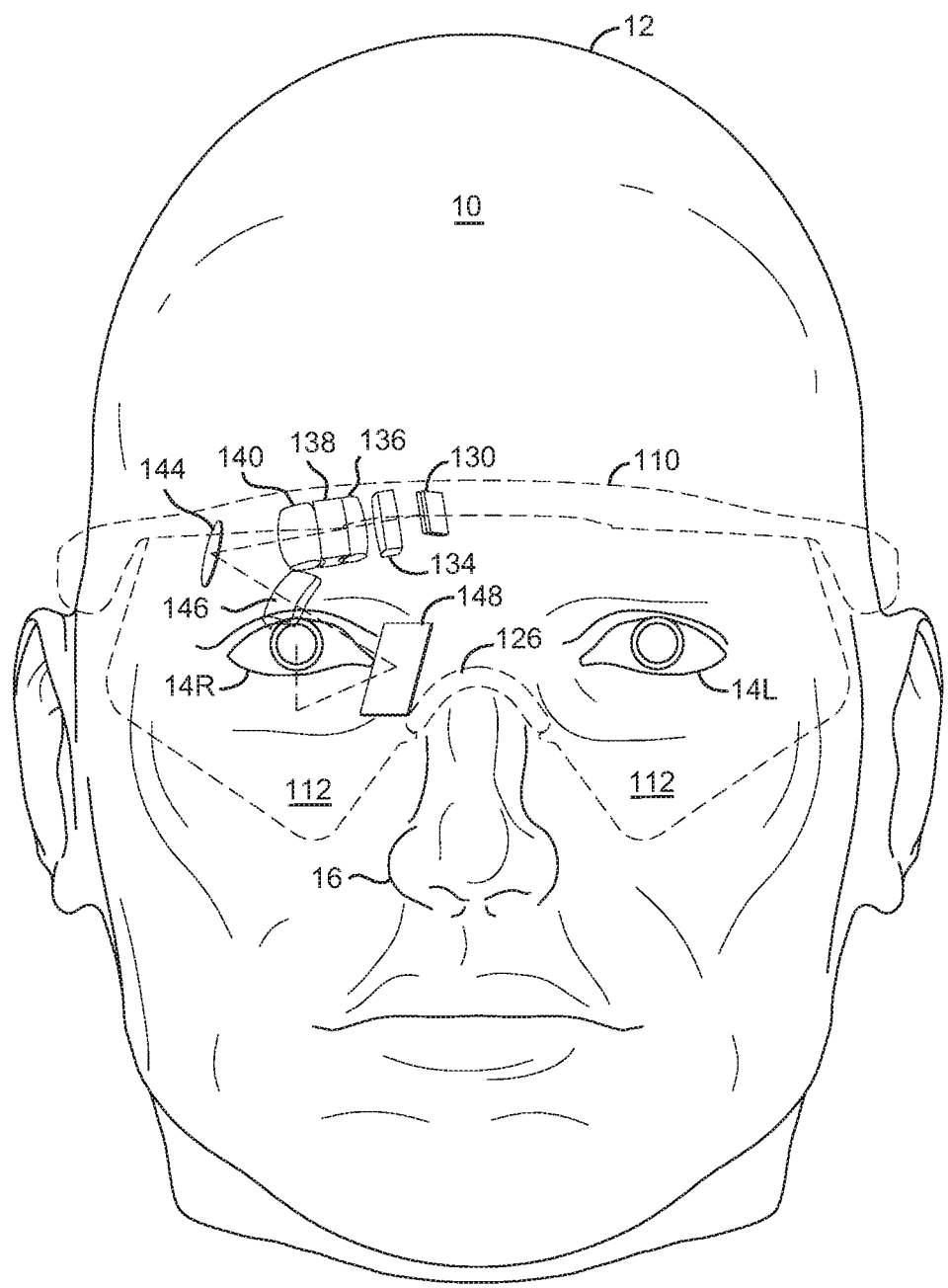
FIG. 2 is a schematic illustration showing a front side view of the user wearable optical display system of FIGS. 1A and 1B in a mounted configuration on a user.
Figure 3:
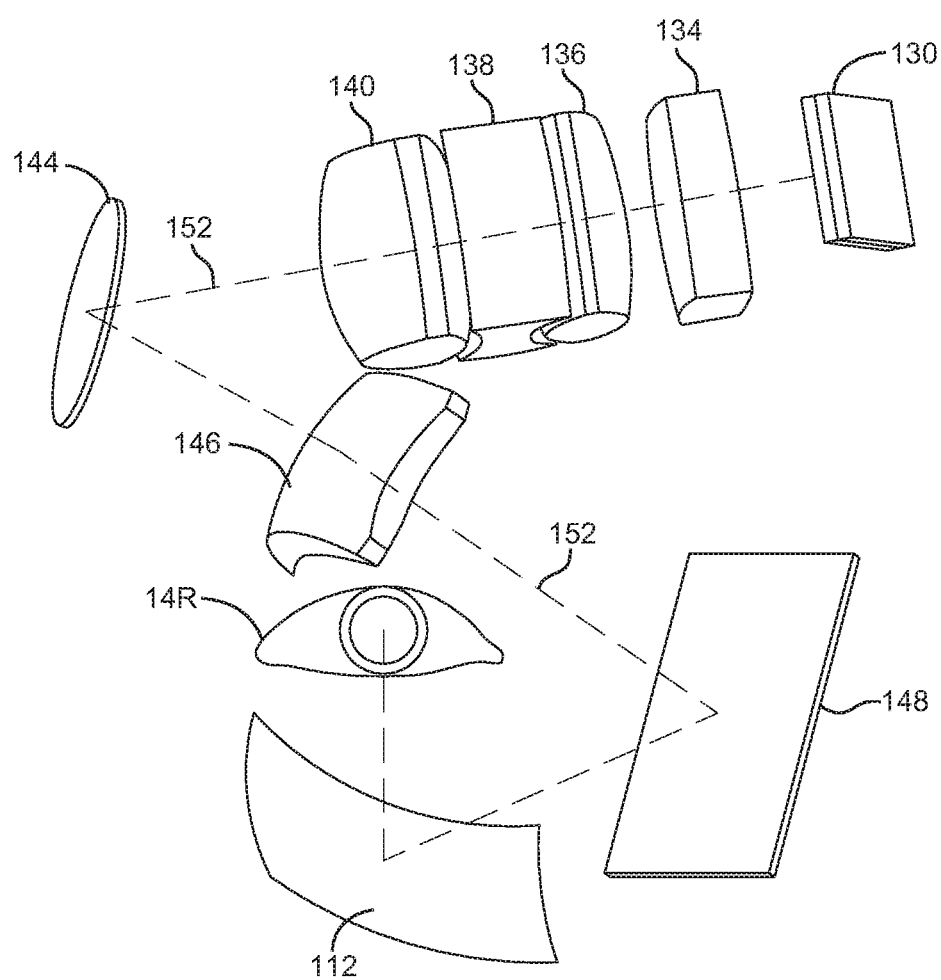
FIG. 3 is a schematic illustration showing a detailed view of the OST display system shown in FIG. 2.
Figure 4:
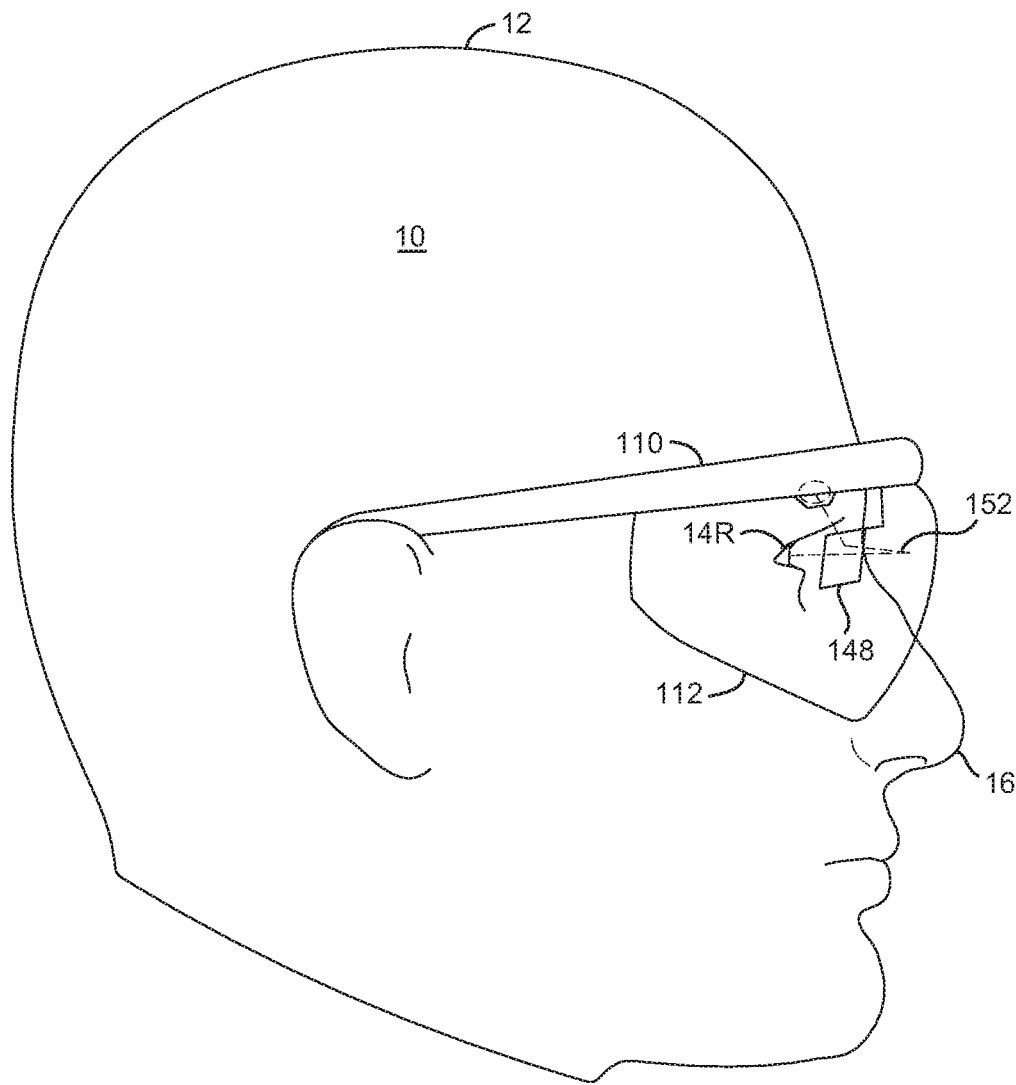
FIG. 4 is a side view of the user wearable optical display system of FIGS. 1A and 1B in a mounted configuration on the user.

Reference is now further made to FIGS. 2, 3, and 4. FIG. 2 is a schematic illustration showing a front side view of the user wearable optical display system of FIGS. 1A and 1B in a mounted configuration on a user. FIG. 3 is a schematic illustration showing a detailed view of the optical display system shown in FIG. 2. FIG. 4 is a side view of the user wearable optical display system of FIGS. 1A and 1B in a mounted configuration on the user. FIG. 2 illustrates a user 10 having a head 12 two eyes 14R (right eye), 14L (left eye), and a nose 16. FIG. 2 further illustrates user attachment section 110 typically embodied in the form of wearable eyewear (e.g., glasses, spectacles, frame, etc.), partially transmissive partially reflective optical part 112, and electro-optical unit 104 having a light projection unit 106 (only partly shown) and lenses and reflectors 108. User attachment section 110 is configured and operative to couple with at least one of head 12 (e.g., via extendable stem elements of glasses that engages with the user's ears) and nose 16 of user 10 as shown in FIG. 2. User attachment section 110 includes a nosepiece 126 configured to support the optical display system (100 and 102) securely on nose 16 of user 10 (optionally via a nosepiece adapter—not shown), such to enable detachable mounting thereon. FIGS. 2 and 3 depict a detailed view of the relative positions and orientations of lenses and reflectors 108, partially transmissive partially reflective optical part 112 and part of light projection unit 106 with respect to user 10 and especially eye 14R of user. Although right eye 14R was selected to explicate the principles of the disclosed technique, without loss of generality, the same principles described herein equally and symmetrically apply to left eye 14L.

Light projection unit (FIGS. 1A and 1B) includes an image generator 130 (FIG. 2). Lenses and reflectors 108 (FIGS. 1A and 1B) of electro-optical unit 104 include lenses 134, 136, 138, 140, and 146, as well as reflectors 144 and 148, forming an optical arrangement as illustrated in FIGS. 2 and 3. Reflector 148 is herein referred to interchangeably as "nose-positioned reflector", "nose reflector", and "exit mirror". For the purpose of clarity, the structural mechanical elements (i.e., chassis, framework) that support or hold lenses and reflectors 108 in relative positions and orientations with respect to each other, and with respect to other components including user attachment section 110, partially transmissive partially reflective optical part 112, and nosepiece 126 have been omitted in FIGS. 2, 3, and 4). The framework (not shown) is configured and operative to precisely position the various components of optical display systems 100 and 102 in precise relative positions and orientations with respect to each other. Altogether these components form an integrated ("unified") optical display system that is capable of and configured and operative to project imagery (e.g., images, video, graphical representations, etc.) onto partially transmissive partially reflective optical part 112 that is superimposed or overlaid over the center of the user's field of view (FOV), while keeping the user's field of regard (FOR) intact without the introduction of obstructions (e.g., non-optical structural elements), or distortions, in accordance with the principles of the disclosed technique. Electro-optical unit 104 in general, and light projection unit 106 in particular, may typically include a nosepiece mechanical adapter (not shown) that is configured to hold nosepiece 126 in place thereby allowing for precise and stabilized positioning of the optical display system with respect to the positions of eyes 14R and 14L of user 10. Light projection unit 106 is opto-mechanically designed and configured to be positioned in a space above the user's nose 16 (at the two sides thereof) between the brow-ridges (*glabella*) and partially transmissive partially reflective optical part 112.

Nose-positioned reflector 148 is typically embodied as a flat front surface mirror. Alternatively, nose-positioned reflector 148 is a flat back surface mirror, a curved front surface mirror, a curved back surface mirror, a curved back surface mirror with a curved front surface (e.g., a Mangin mirror), a prism (e.g., Amici prism), a micro-mirror array (e.g., digital micro-mirror devices (DMD) based on micro-electromechanical systems (MEMS), etc.), a wedge mirror, a polarizing wedge mirror and the like. Further alternatively, nose-positioned reflector 148 is additionally used for corrective optics (i.e., as in prescription optics used to treat certain eye conditions of the user such as myopia, hyperopia, presbyopia, and astigmatism). For such purposes, nose-positioned reflector 148 may have an optical power (e.g., be curved, have a spherical component (diopter), a cylindrical component (for astigmatism), an axis component, and the like). Further alternatively, nose-positioned reflector 148 can have different polarizations (i.e., include a circular polarizer, elliptical polarizer, an angle-variable polarizer, etc.), have photochromic attributes (i.e., darken or lighted according to particular wavelength of electromagnetic (EM) radiation, such as ultraviolet), and the like. The peripheries (i.e., edges) of nose-positioned reflector 148 typically include a non-reflective material (e.g., a coating, a frame, etc.) (not shown) for preventing parasitic stray light rays from reflecting therefrom.

Partially transmissive partially reflective optical part 112 is configured, constructed, and operative to be partially transmissive to light incident on its outer facing surface (i.e., defined as the surface facing the external environment when worn by the user), while concurrently be partially reflective to light incident on its inner, user-facing surface (i.e., defined as the surface facing the eye(s) of user). Partially transmissive partially reflective optical part 112 is aspheric, and generally ellipsoidal (i.e., embodied in the form of part of an ellipsoid (i.e., having a surface that follows the curvature of a part of an ellipsoid)). Partially transmissive partially reflective optical part 112 has a surface that follows the curvature of an ellipsoid that has at least to two foci, such that at least one focus is configured coincide with a position of an eye (i.e., the pupil) of the user. Particularly in the binocular configuration (described in greater detail hereinbelow in conjunction with FIG. 9), each focus is configured to coincide with a respective eye (pupil center position) of the user (i.e., one focus coincides with the pupil position of the right eye, the second focus coincides with the pupil position of the left eye). Partially transmissive partially reflective optical part 112 can be constructed to fit users with different interpupillary distances (IPD)s (i.e., the distance between the two pupil centers of the eyes of the user). Partially transmissive partially reflective optical part 112 is optically designed, configured, and constructed to eliminate distortion effects as may be perceived by the user wearing the optical display system. Partially transmissive partially reflective optical part 112 has a right portion (facing the right eye of the user) and a left portion (facing the left eye of the user), constructed as a single continuous surface (i.e., with no splitting line between right and left portions). In that regard, partially transmissive partially reflective optical part 112 is considered a layered monolithic structure (i.e., having at least one layer, typically several that is a single piece with respect to right and left portions). According to another configuration, partially transmissive partially reflective optical part 112 has a surface that is generally embodied in the form of part of a torus (i.e., having a toric surface that follows the curvature of a part of a torus). According to one construction, partially transmissive partially reflective optical part 112 is entirely constructed and configured to follow the surface of a particular configuration (either ellipsoidal or toric). According an alternative construction, for a particular configuration (either ellipsoidal or toric) at least a portion (e.g., typically a large central part) of partially transmissive partially reflective optical part 112 used to reflect the light beams projected by the electro-optical unit via the nose-positioned reflector are constructed to follow the geometry of that configuration, whereas, the most peripheral parts of partially transmissive partially reflective optical part 112 (e.g., nearest to the ear of the user) that are not optically used according to the principles of the disclosed technique for reflecting the light beams from the electro-optical unit may be embodied in the form of other geometries (e.g., follow other curvatures) and constructions.

Partially transmissive partially reflective optical part 112 is typically constructed from rigid, durable, lens-grade materials such as glass (e.g., optical crown glass), polycarbonate, Trivex®, and the like, as well as at least one reflective optical coating layer whose thickness (at least to some degree) determines its reflective characteristics. The ratio of reflection to transmission, which is typically dependent on the wavelength of light incident on partially transmissive partially reflective optical part 112, may vary. Typical reflection percentages typically lie between 20-40%; whereas typical total transmission percentages lie between 8-70%. Any ratio derived from these percentages is viable. In particular, there may be more than one reflection to transmission ratios of partially transmissive partially reflective optical part 112 (which may be different or the same). One reflection to transmission ratio is associated with light impinging on the user-facing surface (produced by light projection unit 106), the other associated with light impinging on the outward facing surface of partially transmissive partially reflective optical part 112. According to one realization, the optical transmission coefficient of the user-facing surface is greater than the optical reflection. Other transmittance-to-absorbance ratios for partially transmissive partially reflective optical part 112 are viable. For example, a substantially "transparent optical configuration" may exhibit 85% transmittance and have 15% absorption in the intensity of incident light (e.g., monochromatic light or visible light). An "intermediate transparent-opaque optical configuration" may exhibit, for example, 50% transmittance and 50% absorbance in the intensity of incident light, whereas, in an "opaque optical configuration" partially transmissive partially reflective optical part 112 may exhibit 85% absorption in the visible part of the electromagnetic spectrum and only 15% transmittance.

Other, different realizations may be possible, for example, where the outward facing surface (i.e., and/or at least part of partially transmissive partially reflective optical part 112) is embedded with silver halide (silver salts) in microcrystalline form that endow photochromic properties to it. Optionally, an antireflection coating is also applied to the outward facing surface. Further optionally, an anti-abrasion coating is applied to partially transmissive partially reflective optical part 112. Further optionally, an anti-fog coating is applied to partially transmissive partially reflective optical part 112. Further optionally, an oleophobic coating for anti-fingerprinting is applied to partially transmissive partially reflective optical part 112. Further optionally, partially transmissive partially reflective optical part 112 is coated and/or incorporates light-polarized material, which generally enhances the contrast of an image viewed through it (e.g., especially noticeable in snow covered environments). Partially transmissive partially reflective optical part 112 employs shatter resistant ("shatterproof") materials (e.g., polyvinyl butyral (PVB), ethylene-vinyl acetate (EVA), thermoplastic polyurethane (TPU), polyethylene terephthalate (PET), polycarbonate (PC), combinations thereof, etc.) in its construction and/or manufacture such that it exhibits shatterproof and impact-resistant qualities. Moreover, partially transmissive partially reflective optical part is designed to comply with known safety standards of eyewear in general, and eyewear (e.g., sunglasses) used for sporting applications, in particular.

According to other realizations, partially transmissive partially reflective optical part 112 autonomously performs trasmissivity adaptation according to the amount of the ambient luminance levels (also termed herein as "polychromatic functionality"). For example, at high luminance levels the transmissivity is set to 15% transmission, and at low luminance levels the transmissivity is set to 50% transmission. The polychromatic functionality may be realized by constituent material from which partially transmissive partially reflective optical part 112 is constructed (e.g., by combining with special pigments that exhibit polychromatic characteristics), by coating the outward-facing surface with a polychromatic coating, and the like.

According to another realization of partially transmissive partially reflective optical part 112, at least a part or portion thereof (i.e., an area of its surface is see-through (e.g., "a see-through patch"), while its complementary part is at least partially opaque. Alternatively, partially transmissive partially reflective optical part 112 is totally transparent, or totally opaque. Further alternatively, partially transmissive partially reflective optical part 112 exhibits a transparency to light in at least one range of light wavelengths. Further alternatively, partially transmissive partially reflective optical part 112 exhibits opacity to light in at least one range of light wavelengths.

Nosepiece 126 is configured to engage with nose 16 of user 10 and including for lateral positioning of the optical display system in front of at least one eye 14R and 14L of user 10. Nosepiece 126 enables, and is configured to, mechanically couple with nose-positioned reflector 148, such that the latter is positioned on a side of nose 16 of user 10, as shown in FIG. 2. A principal light ray 152 (FIGS. 2 and 3) is shown to propagate through electro-optical unit 104, originating from image generator 130 toward lenses 134, 136, 138, 140, reflector 144, lens 146, nose-positioned reflector 148, partially transmissive partially reflective optical part 112 toward eye 14R of user 10. Nose-positioned reflector 148 reflects impinging light beams thereon toward partially transmissive partially reflective optical part 112 and toward eye 14R of user 10. User attachment section 110 (shown in FIG. 2 as glasses frame) is configured to and operative to detachably couple to user 10 (e.g. via ears, head 12, nose 16, etc.) and support a precise positioning and angular alignment so to allow user 10 to observe a projected image (not shown) partially reflected by partially transmissive partially reflective optical part 112 and overlaid with the user's FOR about the center of the user's FOV. Although FIGS. 2, 3 and 4 show a right eye monocular optical configuration, the disclosed technique is likewise applicable to a left eye monocular optical configuration, as well as a binocular optical configuration described in detail hereinbelow in conjunction with FIG. 9.

Alternatively, instead of one nose-positioned reflector, there is a plurality of nose-positioned reflectors (not shown) that are configured and operative to further (1) fold the light beams (the optical path) such to better conform with user attachment section 110 and the user's eye(s), and/or (2) turn or rotate the displayed image to better conform with the user attachment section 110 and the user's eye(s). The nose-positioned reflectors are configured to be positioned at the side of nose 16 of user 10. The nose-positioned reflectors are configured to assume at least one of the following configurations or arrangements: (a) at least one nose-positioned reflector is mechanically coupled with nosepiece 126; (b) are mechanically coupled with each other; (c) at least two nose-positioned reflectors are contiguous to each other; (d) all of the nose-positioned reflectors are contiguous to each other; (e) at least two nose-positioned reflectors are positioned separate from each other; (f) all of the nose-positioned reflectors are positioned separate from each other; (g) are positioned at various vertical and horizontal positions along the side of nose 16; and (h) at least two are oriented at an angle with respect to each other. The plurality of nose-positioned reflectors may be embodied as planar mirrors, prisms (e.g., Amici prisms), micro-mirrors (e.g., digital micro-mirror devices (DMD) based on microelectromechanical systems (MEMS), wedge mirror, etc.), and the like.

Figure 5A:
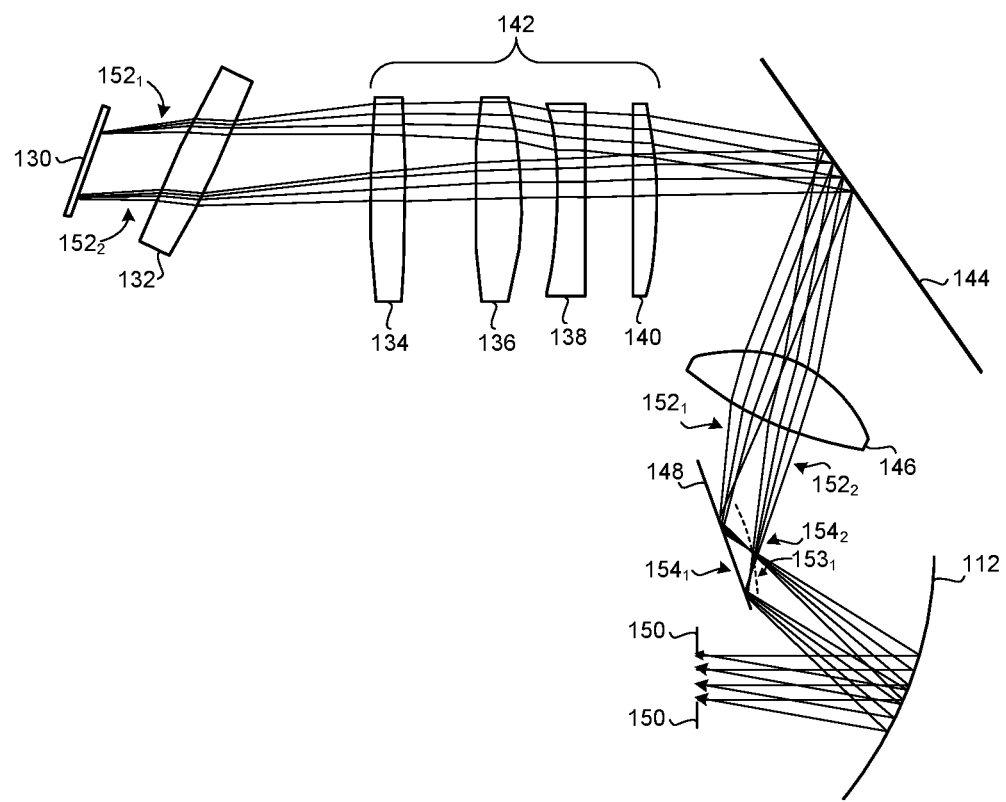
FIG. 5A is an optical path schematic diagram showing a first lens configuration of the optical elements of the optical display systems of the disclosed technique.

Reference is now further made to FIG. 5A, which is an optical path schematic diagram showing a first lens configuration of the optical elements of the optical display systems of the disclosed technique. As shown, light projection unit 106 of FIGS. 1A and 1B is shown to include an image generator 130. Lenses and reflectors 108 of FIGS. 1A and 1B of electro-optical unit 104 are shown to include lenses 132, 134, 136, 138, 140, and 146, as well as reflectors 144 and 148 that form an optical arrangement termed as a "first lens configuration", including light ray paths, as illustrated in FIG. 5A. Lenses 134, 136, 138, and 140 form a lens group 142. The distances between the lenses in lens group 142 are slightly exaggerated for the purpose of clearly showing the light beams. The lenses of electro-optical unit 104 according to the first lens configuration shown in FIG. 5A are also denoted interchangeably herein as follows: lens 146 is denoted "first lens", lens 140 is denoted "second lens", lens 138 is denoted "third lens", lens 136 is denoted "fourth lens", lens 134 is denoted "fifth lens", and lens 132 is denoted "sixth lens". The reflectors of electro-optical unit 104 according to the first lens configuration shown in FIG. 5A are also denoted interchangeably herein as follows: reflector 148 is denoted "first reflector" and/or "nose-positioned reflector", and reflector 144 is denoted "second reflector".

Image generator 130 (FIGS. 2, 3, and 5A) is configured and operative to generate light in general and light encoded with information (e.g., in the form of an image) in particular, from which light beams $152_1$ $152_2$ (FIG. 5A) originate, then pass through (i.e., refract by) lens 132 (FIG. 5A) and the lenses of lens group 142 (FIG. 5A). In particular, the light beams refract sequentially through lenses 132, 134, 136, 138, 140 and impinge on reflector 144. Reflector 144 is configured to reflect and fold the light beams so as to direct them to lens 146, the latter of which refracts the light beams and directs them onto reflector 148. Reflector 148 (nose-positioned reflector) is configured to reflect and fold the incoming light beams impinging thereon toward partially transmissive partially reflective optical part 112. Partially transmissive partially reflective optical part 112 is configured to reflect (at least partially) the light beams from reflector 148 through an aperture (stop) 150 and toward at least one eye of the user. An intermediate image $153_1$ forms along an optical path before ($154_1$) and after ($154_2$) reflecting off from reflector 148.

In the reduced configuration shown in FIG. 1A, image generator 130 is configured and operative to generate, display and irradiate light encoded with information according to the different modes of operation of light projection unit 106. According to the expanded configuration shown in FIG. 1B, image generator 130 is configured and operative to generate, display and irradiate light encoded with information by receiving data from processor 114. Image generator 130 is generally configured and operative as a near-eye display, typically embodied in the form of an organic light emitting diode (OLED) display. Alternatively, image generator 130 may employ other types of display technologies, such as those of liquid crystal displays (LCDs), electroluminescent displays (ELDs), liquid crystal on silicon (LCoS/LCOS) displays, active-matrix liquid-crystal display (AMLCD), quantum dot display (QLED), and the like.

The off-axis optical arrangement shown in FIG. 5A ("first lens configuration") involves the following example configuration. Lens 132 is typically embodied as a field lens, lenses 134 and 136 are biconvex, lens 138 is planar convex, lens 140 is planar convex, reflector 144 is planar (e.g., folding mirror), lens 146 is generally biconvex, reflector 148 is planar (e.g., folding mirror), and partially transmissive partially reflective optical part 112 is ellipsoidal (i.e., has a surface that follows the curvature of at least part of an ellipsoid). Lens group 142 is designed, configured and operative to minimize optical aberrations including distortion and chromatic aberrations. Lens 146 is configured to refract and to converge the light beams onto reflector 148. Reflector 148 is configured to fold light beams from lens 146 and further disposed in position and orientation along an optical path between lens 146 and partially transmissive partially reflective optical part 112 such that the light beams reflecting off partially transmissive partially reflective optical part 112 form a collimated beam that is directed toward an eye of the user.

Figure 5B:
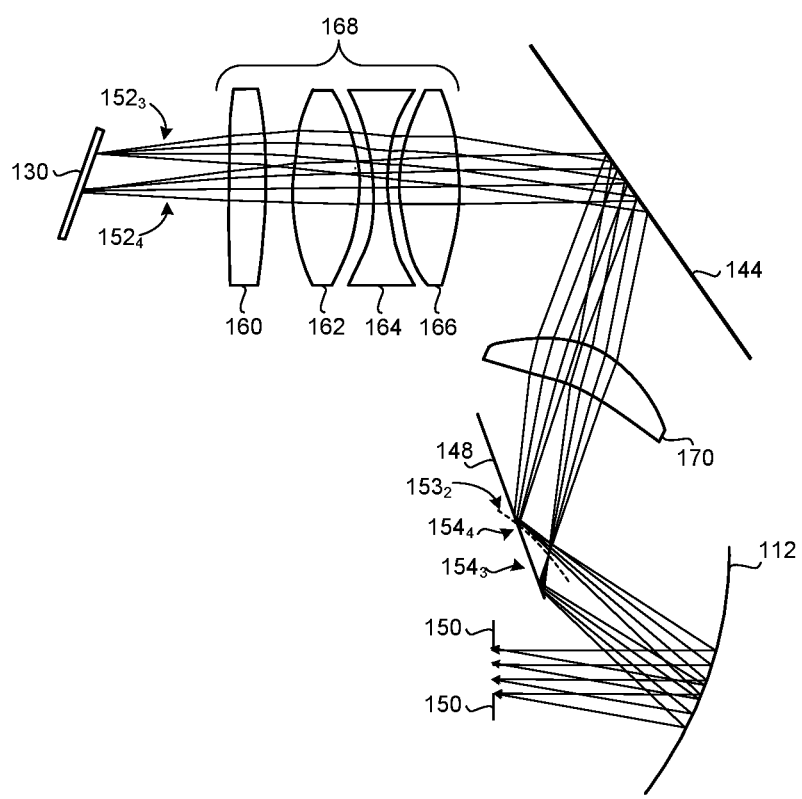
FIG. 5B is an optical path schematic diagram showing optical elements of the optical display systems of the disclosed technique, according to another optical configuration.

According to another optical configuration, herein denoted a "second lens configuration" field lens 132 is excluded. To illustrate this alternative optical configuration reference is further made to FIG. 5B, which is an optical path schematic diagram showing optical elements of the optical display systems of the disclosed technique, according to another optical configuration. The optical configuration shown in FIG. 5B is similar to that of FIG. 5A, apart from the exclusion of filed lens 132, the elements in lens group 142 (FIG. 5A) and their optical characteristics (e.g., optical power, focal lengths, radii of curvature, etc.). The second lens configuration shown in FIG. 5B includes image generator 130, lens 160, lens 162, lens 164, lens 166, lens 170, reflector 144 and reflector 148. Lenses 160, 162, 164, 166 are grouped in lens group 168. Reflectors 144 and 148 are identical respectively to those shown in the first lens configuration shown in FIG. 5A. Likewise, image generator 130 and partially transmissive partially reflective optical part 112 are identical respectively to those shown in FIG. 5A. The second optical configuration of FIG. 5B, similarly to the first optical configuration of FIG. 5A, image generator 130 is configured and operative to generate light in general and light encoded with information (e.g., in the form of an image) in particular, from which light beams $152_3$ and $152_4$ (FIG. 5B) originate, then pass through (i.e., refract by) the lenses of lens group 168. In particular, the light beams refract sequentially through lenses 160, 162, 164, 166 and impinge on reflector 144. Reflector 144 is configured to reflect and fold the light beams so as to direct them to lens 170, the latter of which refracts the light beams and directs them onto reflector 148. Reflector 148 (nose-positioned reflector) is configured to reflect and fold the incoming light beams impinging thereon toward partially transmissive partially reflective optical part 112. Partially transmissive partially reflective optical part 112 is configured to reflect (at least partially) the light beams from reflector 148 through an aperture (stop) 150 and toward at least one eye of the user (e.g., right eye 14R as shown in FIGS. 2 and 3).

The off-axis optical arrangement shown in FIG. 5B ("second lens configuration") involves the following example configuration. Lenses 160 and 162 are biconvex, lens 164 is biconcave, lens 140 biconvex, reflector 144 is planar (e.g., folding mirror), lens 170 is generally, positive meniscus lens, reflector 148 is planar (e.g., folding mirror), and partially transmissive partially reflective optical part 112 is ellipsoidal. Lens group 168 is designed, configured and operative to minimize optical aberrations including distortion and chromatic aberrations. Lens 170 is configured to refract and to converge the light beams onto reflector 148. Likewise to the first optical configuration of FIG. 5A, reflector 148 is configured to fold light beams from lens 170 and further disposed in position and orientation along an optical path between lens 170 and partially transmissive partially reflective optical part 112 such that the light beams reflecting off partially transmissive partially reflective optical part 112 form a collimated beam that is directed toward an eye of the user. An intermediate image $153_2$ forms along an optical path before ($154_3$) and after ($154_4$) reflecting off from reflector 148.

The lenses of electro-optical unit 104 according to the second lens configuration shown in FIG. 5B are also denoted interchangeably herein as follows: lens 170 is denoted "first lens", lens 166 is denoted "second lens", lens 164 is denoted "third lens", lens 162 is denoted "fourth lens", and lens 160 is denoted "fifth lens". References to the reflectors of electro-optical unit 104 according to the second lens configuration of FIG. 5B are respectively identical with those of the second lens configuration of FIG. 5A.

Optical display systems 100 and 102 provide user 10 wearing the system with both an unobstructed viewing capability of visual scenes within the user's field of regard (FOR), such as external real-world scenery, as well as simultaneously enabling light encoded data to be presented (i.e., displayed in a superimposed manner on partially transmissive partially reflective optical part 112) to the user within that FOR. In contrast to prior art systems that at least partially block the user's FOR by positioning at least one of a non-transparent, a translucent functional element, an optical waveguide (which may introduce distortions and further endanger the user's eye and face in case of facial impact) in front of the eyes of the user, thereby reducing the user's FOR, the optical display systems of the disclosed technique are optically configured and constructed to have a unique optical arrangement exhibiting reduced physical dimensions thereby allowing electro-optical unit 104 to be substantially positioned at the forehead and glabellar region of the user, so as to minimize hardware obstructions to the user's FOR.

Figure 6A:
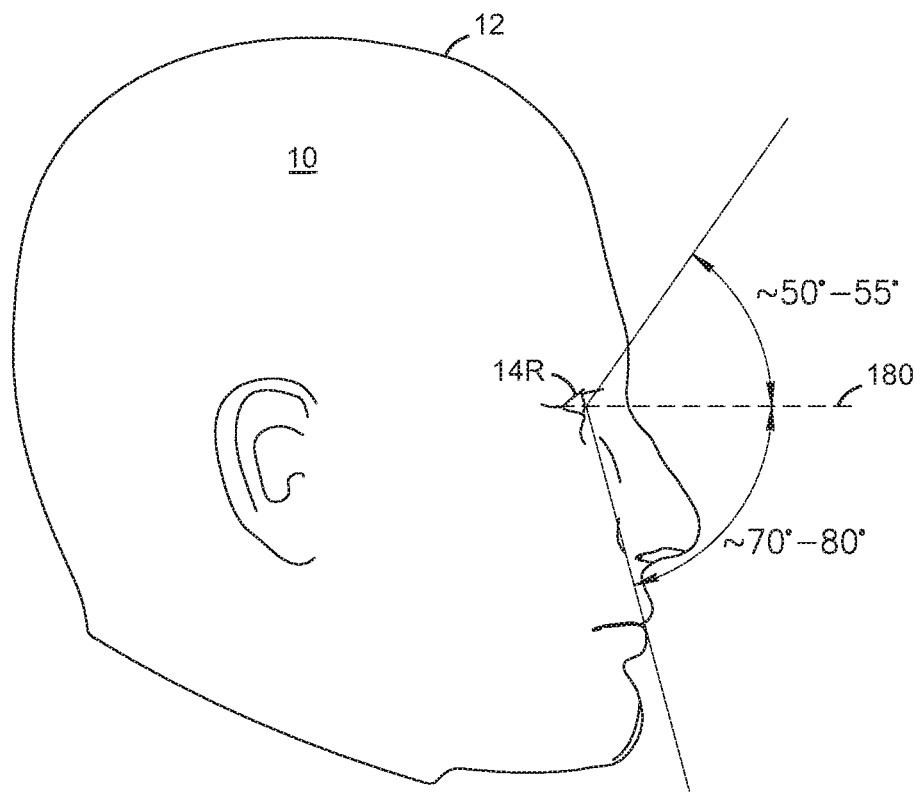
FIG. 6A is a schematic diagram illustrating a typical vertical field of regard provided to a user wearing the optical display systems of the disclosed technique.
Figure 6B:
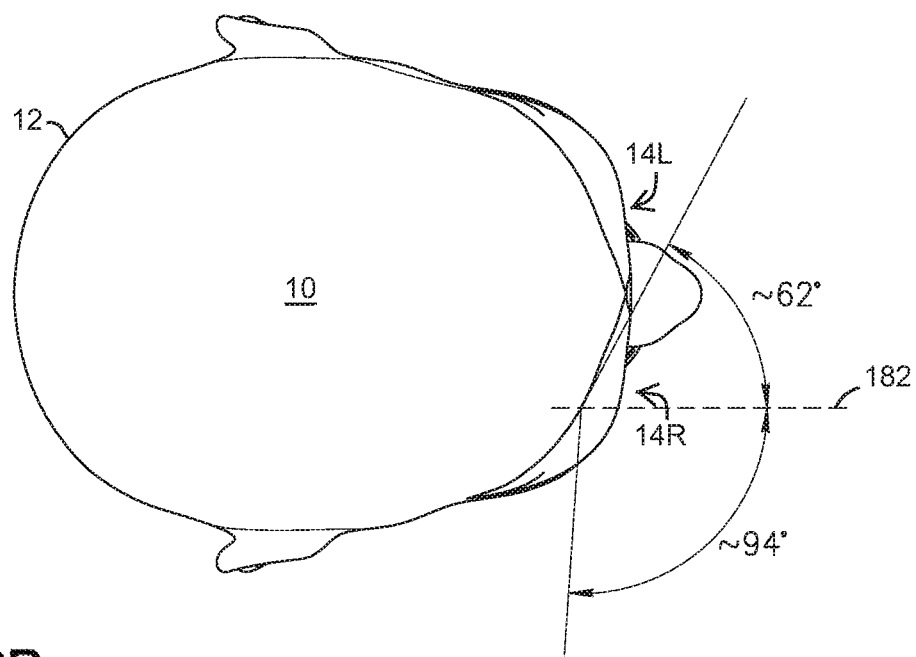
FIG. 6B is a schematic diagram illustrating a typical horizontal field of regard provided to a user wearing the optical display systems of the disclosed technique.

To further detail the enhanced FOR afforded to the user by user wearable optical display systems 100 and 102, reference is now further made to FIGS. 6A and 6B. FIG. 6A is a schematic diagram illustrating a typical vertical field of regard provided to a user wearing the optical display systems of the disclosed technique. FIG. 6B is a schematic diagram illustrating a typical horizontal field of regard provided to a user wearing the optical display systems of the disclosed technique. FIG. 6A illustrates a right side view of head 12 of user 10 showing a typical vertical FOR afforded to user 10, who wears wearable optical display systems 100 and 102 (not shown for the sake of lucidity), with respect to a horizontal (level, e.g., horizon) viewing angle axis 180 (a "centerline axis"). The centerline axis is generally defined as a viewing axis of user 10 (stranding straight) when looking forward with eyes 14L and 14R focused to infinity at the horizon. The vertical FOR that is above horizontal viewing angle axis 180 (i.e., in an upward vertical viewing direction) is approximately between 50°-55°. The vertical FOR afforded to user 10 that is below horizontal viewing angle axis 180 (i.e., in a downward vertical viewing direction) is approximately between 70°-80°. Hence the total vertical FOR afforded to user 10 is approximately between 120°-135°.

FIG. 6B illustrates a top view of head 12 of user 10 showing a typical horizontal FOR afforded to user 10, who wears optical display systems 100 and 102 (not shown), with respect to right eye 14R centerline axis 182 (i.e., the "central line-of-sight (LOS) axis", or "central forward-looking gaze direction"). The horizontal FOR of (right) eye 14R of user 10 to the left (i.e., in a leftward direction) of centerline axis 182 is approximately 62°. The horizontal FOR of (right) eye 14R of user 10 to the right (i.e., in a rightward direction) of centerline axis 182 is approximately 94°. The typical horizontal FOR of (left) eye 14L (i.e., with respect to a left centerline axis (not shown)) is similar to that of (right) eye 14R. Hence, the total horizontal FOR afforded to each eye of user 10 is approximately 156°.

Figure 7:
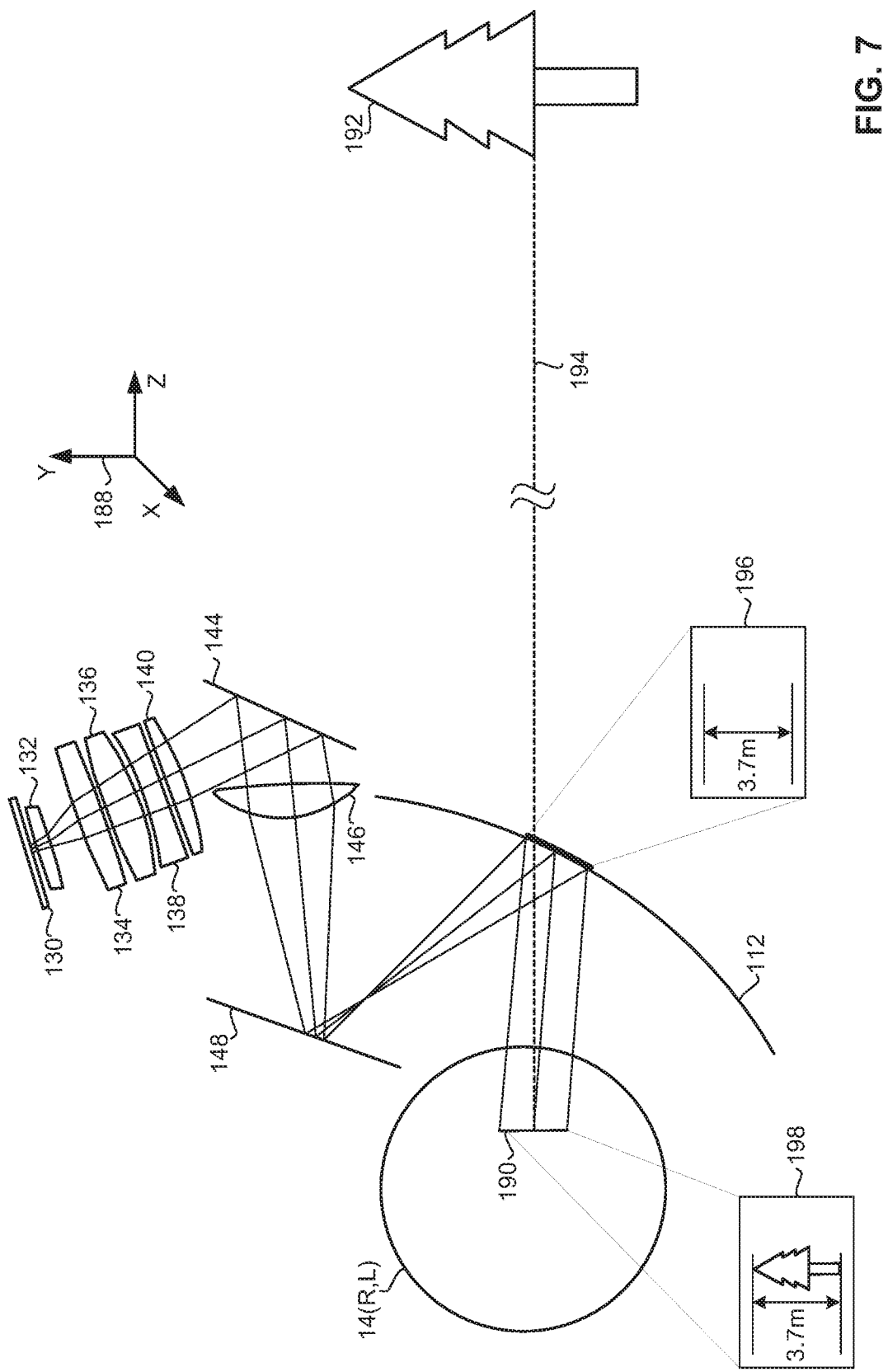
FIG. 7 is a schematic illustration of a representative optical arrangement showing a displayed image superimposed on an external object viewed by an eye of a user via the optical display system of the disclosed technique.

Reference is now further made to FIG. 7, which is a schematic illustration of a representative optical arrangement showing a displayed image superimposed on an external object viewed by an eye of a user via the optical display system of the disclosed technique. FIG. 7 illustrates the first optical configuration shown in FIG. 5A including image generator 130, lenses 132, 134, 136, 138, 140 and 146, reflectors 144 and 148, and partially transmissive partially reflective optical part 112. Further shown is eye 14 of user 10 (either 14R or 14L) and a distant object 192 distanced from the optical display system and the user. Light projection unit 106 that includes image generator 130 irradiates and projects light encoded with information, such as an image 196, whose light beams associated therewith are directed onto a pupil 190 of the user's eye 14R, L. (FIG. 7 excludes the focusing effect by the eye's internal lens on incoming light beams.) Nose-positioned reflector 148 ("exit mirror"), which is configured to be located at the side of the upper portion of nose 16 (FIGS. 2,4) and coupled with nosepiece 126 (FIG. 2), at eye-level, directs the projected image toward the partially transmissive partially reflective optical part 112 (e.g., semi-transparent ellipsoidal glasses), which reflects at least part of the light beams (image 196) back toward to user's eye, about the Z direction of coordinate system 188 coaxially aligned with the user's line of sight (LOS) 194, observing distant object 192 ("scenery"). Thus, optical display systems 100 and 102 project an image 196 onto partially transmissive partially reflective optical part 112 such that image 196 appears to user 10 to be coaxially aligned with LOS 194 and outwardly viewed object 192 as representatively shown by a user-perceived image 198.

Figure 8:
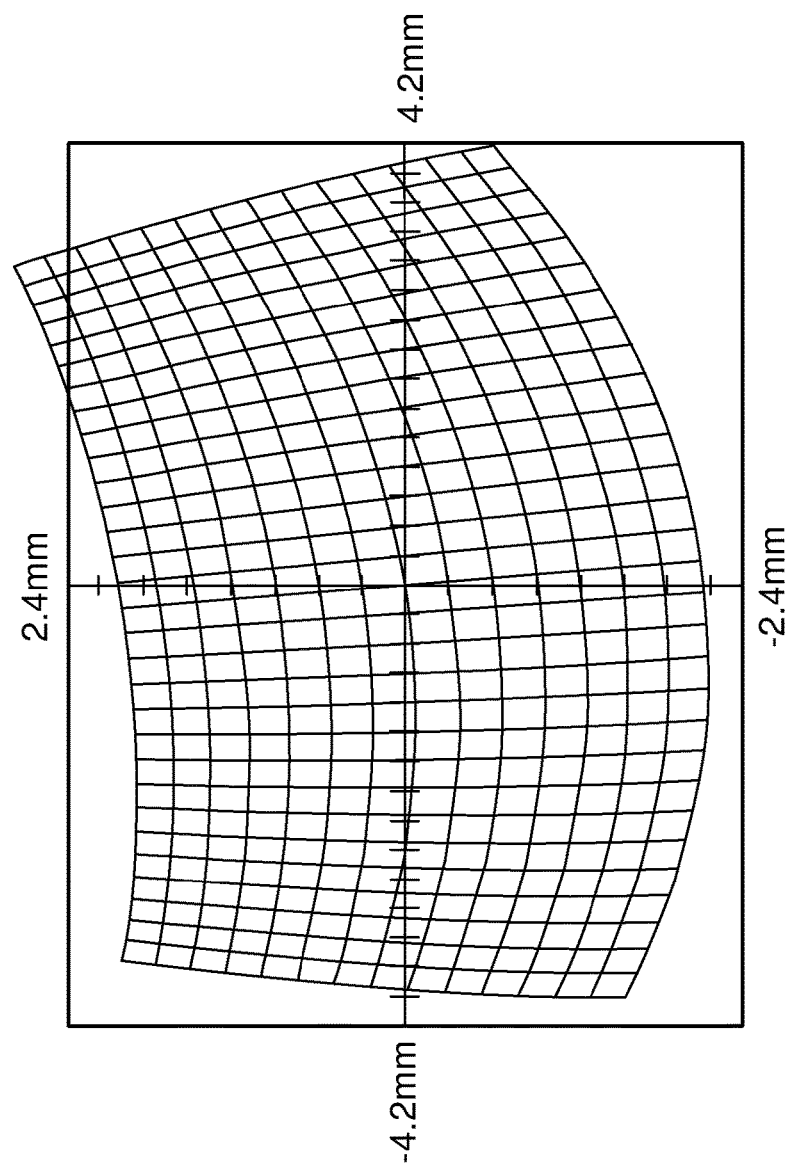
FIG. 8 is a schematic illustration showing an example optical field of view as projected through the optical systems of the disclosed technique.

Reference is now made to FIG. 8, which is a schematic illustration showing an example optical field of view as projected through the optical systems of the disclosed technique. FIG. 8 shows an illustration of the FOV of optical display systems 100 and 102 as a mesh grid display. FIG. 8 provides information pertaining to distortion in general and distortion correction in particular.

According to another aspect of the disclosed technique there is provided a wearable optical display system exhibiting a binocular wide field of view (WFOV). The binocular system of the disclosed technique provides a user with greater realism of visual perception through stereo vision, thereby enabling depth perception to the user. In that respect, the wearable binocular WFOV display system of the disclosed technique provides the capability of displaying separate image channels (e.g., images, video) separately and independently each eye of the user. To further elucidate the particulars of the wearable optical display system having binocular WFOV, reference is now further made to FIG. 9, which is a schematic illustration of a wearable binocular wide field of view (WFOV) optical display system, generally referenced 200, constructed and operative in accordance with another embodiment of the disclosed technique.

Figure 9:
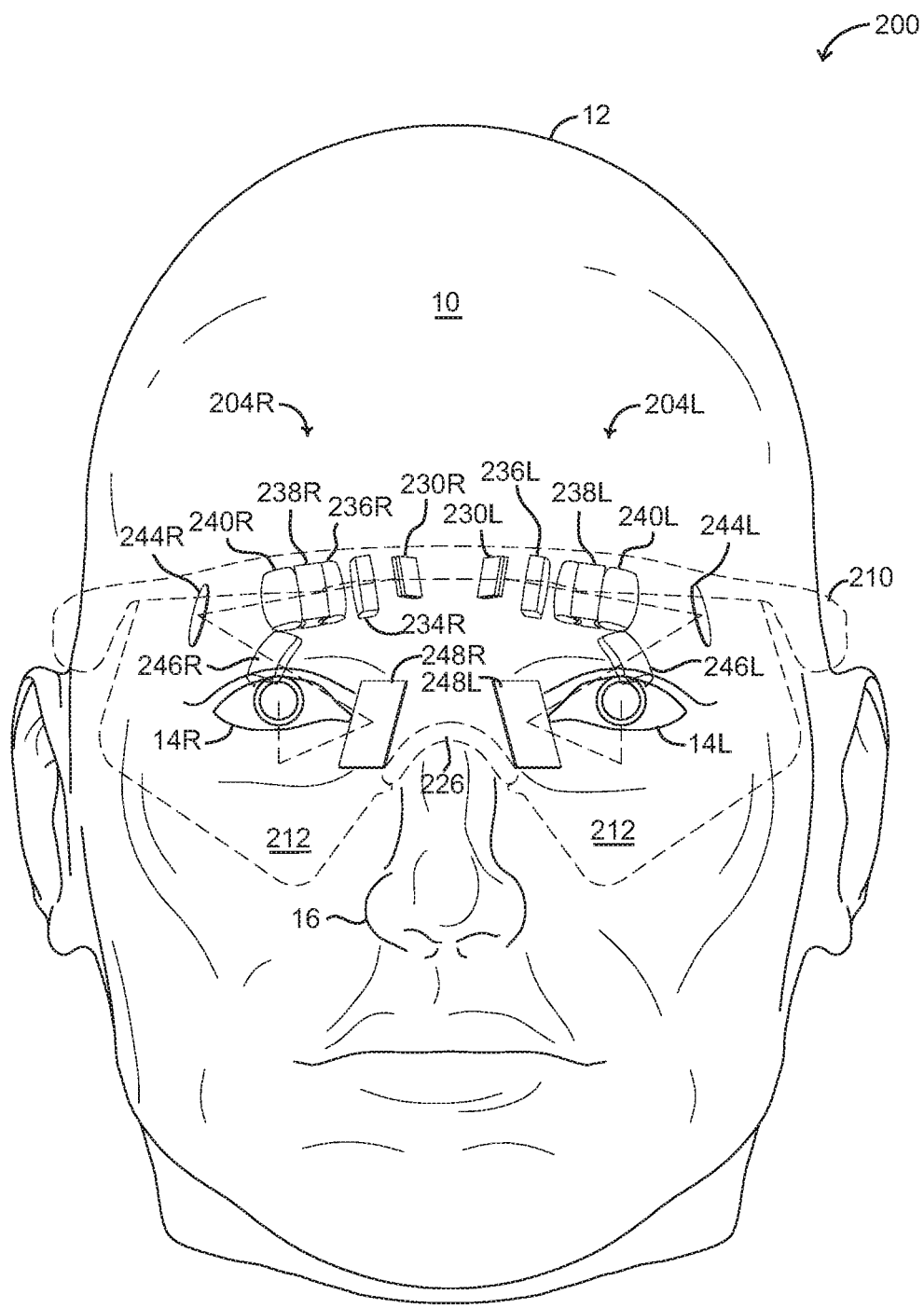
FIG. 9 is a schematic illustration of a wearable binocular wide field of view (WFOV) optical display system, constructed and operative in accordance with another embodiment of the disclosed technique.

FIG. 9 shows binocular optical configuration of a wearable optical display system (also denoted interchangeably as "binocular near-eye see-trough visor projected display system" or "binocular near-eye display system), which is similar to optical display systems 100 and 102 described in conjunction with FIGS. 1A through 8. Essentially, the same components and principles from the previous embodiment (monocular optical configuration) apply to the present embodiment (binocular optical configuration), apart from wearable binocular optical display system 200 having two sets of electro-optical unit 104 (FIGS. 1A, 1B), one for right eye 14R, as described hereinabove with respect to the monocular optical configuration, and another electro-optical unit 104 associated with left eye 14L of user 10. Specifically, wearable binocular optical display system 200 includes two electro-optical units: 204R for a right channel (corresponding to right eye 14R) and 204L for a left channel (corresponding to left eye 14L). Electro-optical units 204R and 204L are each component-wise and operation-wise identical with electro-optical unit 104 of FIGS. 1A, 1B, and 2. The main difference is the positioning of the two electro-optical units 204R and 204L (and their corresponding components), which are symmetric about a face vertical axis of symmetry (i.e., a central virtual line dividing the right and left halves of the face of user 10).

The reduced and expanded configurations of FIGS. 1A and 1B, respectively, are likewise applicable to binocular optical display system 200. In a reduced configuration of binocular optical display system 200, common components to both right and left channels include a user attachment section 210 (similar to user attachments section 110), a partially transmissive partially reflective optical part 212 (similar to partially transmissive partially reflective optical part 112), and a nosepiece 226 (similar to nosepiece 126). In an expanded configuration of binocular optical display system 200, common components to both right and left channels further include a processor 214 (not shown, but similar to processor 114), a memory 216 (not shown, but similar to memory 116), a user interface 218 (not shown, but similar to user interface 118), and a communication module 220 (not shown, but similar to communication module 120). The coupling and operation of these components are the same to those shown in FIGS. 1A and 1B.

The components of electro-optical unit 204L, corresponding to the left channel, include an image generator 230L (same as image generator 130R), lenses 236L, 238L, 240L, and 246L (respectively the same as lenses 136R, 138R, 140R, and 146R), and reflectors 244L, and 248L (respectively the same as reflectors 144R and 148R). Analogously, the components of electro-optical unit 204R, corresponding to the right channel, include an image generator 230R (same as image generator 130R), lenses 236R, 238R, 240R, and 246R (respectively the same as lenses 136R, 138R, 140R, and 146R), and reflectors 244R, and 248R (respectively the same as reflectors 144R and 148R).

FIG. 9 shows a front side view of binocular optical display system 200 being worn on head 12 of user 10. In accordance with the present embodiment of the disclosed technique, electro-optical unit 204R is configured to project light encoded with information (e.g., in the form of an image, video, etc.) toward right eye 14R, and concurrently electro-optical unit 204L is configured to project light encoded with information toward left eye 14L of user 10. Electro-optical units 204R and 204L are opto-mechanically designed and configured to be positioned (and fit) within a space above and at the two sides of the upper portion of nose 16, at the most interior point of the forehead between the brow-ridges (*glabella*), and the inner surface of partially transmissive partially reflective optical part 212. The mechanical structure and configuration of electro-optical units 204L and 204R incorporate a built-in nose piece adapter (not shown) that is configured to hold nosepiece 226, thereby allowing precise and stabilized positioning of binocular optical display system 200 with respect to the positions of the user's eyes 14L and 14R. Also shown in FIG. 9, nose-positioned reflectors 248L and 248R are respectively positioned on the left and right sides of nose 16, and are both mechanically coupled to (left and right sides of) nosepiece 226. Each one nose-positioned reflectors 248L and 248R is configured to direct projected light beams from its respective (projection) channel towards partially transmissive partially reflective optical part 212, which in turn is configured to at least partly reflect back the light beams respectively toward left and right eyes 14L and 14R of user 10. According to one mode of operation of binocular optical display system 200 electro-optical units 204L and 204R are configured and operative to project identical images toward left and right eyes 14L, 14R, respectively. According to another mode of operation, electro-optical units 204L and 204R are configured and operative to project different images toward left and right eyes 14L and 14R, respectively. According to one binocular hardware configuration, two image generators are used as image sources for each of the left and right exit pupils, (one per each of left and right eye), thereby enabling the projection of different images for each eye simultaneously. Processor 214 is configured and operative to generate 3-D images, which in turn are projected by electro-optical units 204L and 204R in a mutual overlapping region in the field of vision of eyes 14L and 14R of user 10.

According to another alternative binocular hardware configuration (not shown), only one image generator is used for both left and right exit pupils, such that an optical switching device (not shown) is configured and operative to alternately block one of the left and right exit pupils synchronously in accordance with a characteristic frame rate of the image generator (such that an image is generated alternately to the left and right eyes). In such a configuration nose-positioned reflectors 248L and 248R are configured and operative to align respective left and right images to a common plane. An additional folding mirror (not shown) maybe employed to align the two image planes of the left and right channels to a common plane. For example, an image frame rate of 120 Hz or more is employed as the alternating frequency, thereby providing each eye with a separate image, at a rate of 60 Hz. According to a further alternative binocular hardware configuration (not shown), only one image generator is employed for both left and right eyes, such by further including an image splitter to split a light projection unit generated image to both left and right channels. Generally, the first and second light projection units of electro-optical units 204R and 204L are configured to project a right image sequence, and a left image sequence (respectively), according with at least one of the following binocular modes of operation: (1) the right image sequence and the left image sequence are identical; (2) the left image sequence and the right image sequence are different; (3) the right image sequence and the left mage sequence are projected in alternation, (4) the right image sequence and the left image sequence are projected at difference frame rates; (5) the right image sequence and left image sequence are projected at differing optical characteristics (e.g., polarizations, colors, etc.); and (6)) the right image sequence and left image sequence are projected to have the same optical characteristics (e.g., polarizations, colors, etc.).

Partially transmissive partially reflective optical part 112 is embodied as an ellipsoid reflector (i.e., having a surface that follows the curvature of a part of an ellipsoid). In the current binocular optical configuration and in accordance with FIGS. 6A and 6B the total vertical FOR afforded to user 10 is approximately between 120°-135°, and the total horizontal FOR afforded to each eye of user 10 is approximately 156°.

According to an alternative expanded configuration of binocular optical display system 200, there are two processors 214L and 214R (not shown) each corresponding to a respective channel (left and right), and/or two memory devices 216L and 216R (not shown) each corresponding to a respective channel, and/or two user interfaces 218L and 216R (not shown) each corresponding to a respective channel, and/or two communication modules 220L and 220R (not shown) each corresponding to a respective channel. Further alternatively, there are two different user attachment sections 210R and 210L (not shown) each configured to be detachably coupled with a respective side (left, right) of the user's face. In this alternative configuration, each user attachment section (corresponding to left or right sides) is configured to couple (e.g., mechanically support, at least partially house, etc.) with left or right electro-optical units 204L and 204R.

Figure 10:
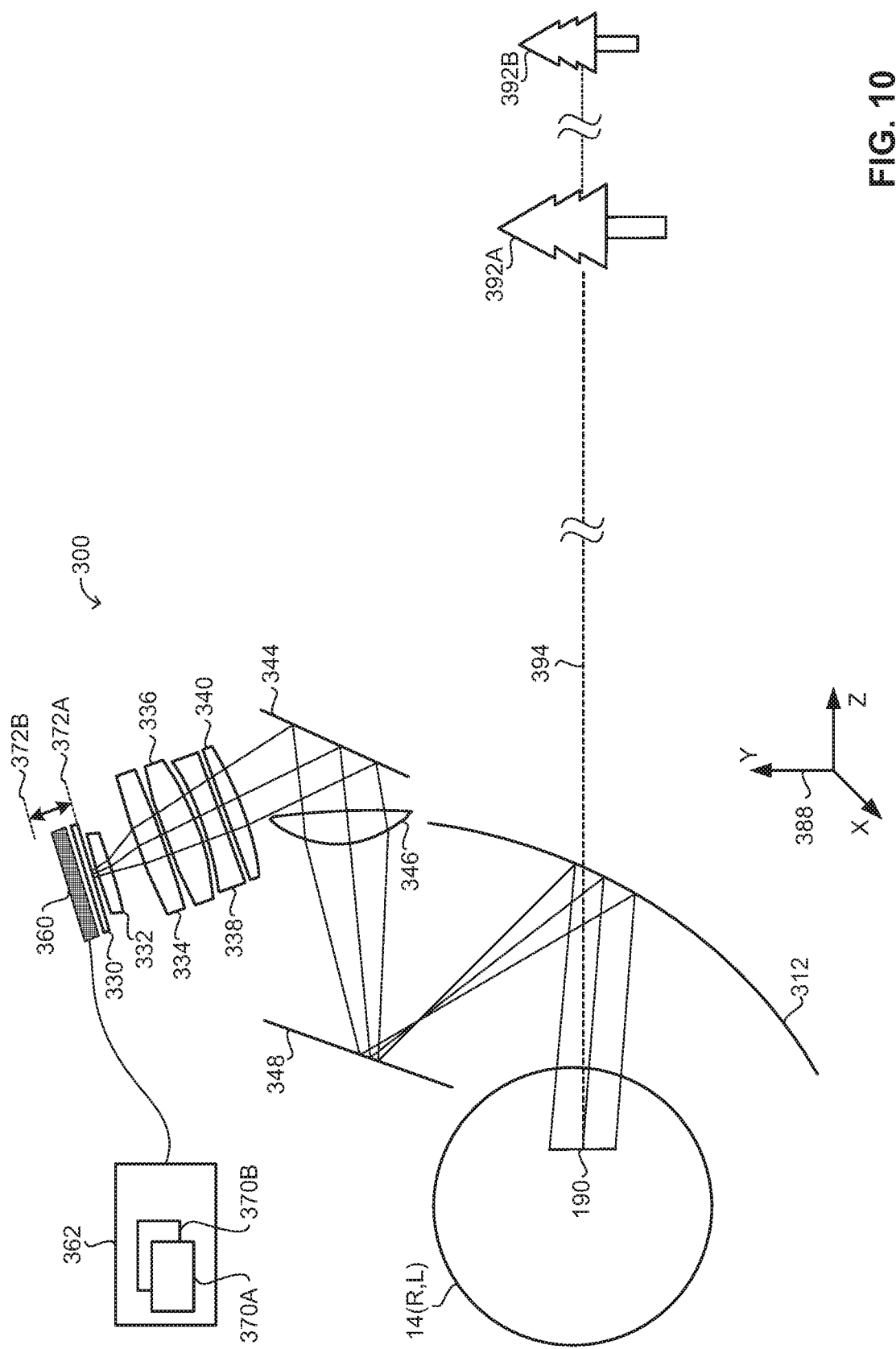
FIG. 10 is a schematic illustration of an optical display system constructed and operative in accordance with a further embodiment of the disclosed technique.

Reference is now made to FIG. 10, which is a schematic illustration of an optical display system, generally referenced 300, constructed and operative in accordance with a further embodiment of the disclosed technique. Optical display system 300 is configured and operative with a multi-focal intra-frame image projection capability. Optical display system 300 shares many identical components (including their functionality) to those of optical display systems 100 and 102 shown in FIG. 7. Specifically, optical display system 300 includes an image generator 330 (similar to image generator 130), lenses 332, 334, 336, 338, 340 and 346 (respectively similar to lenses 132, 134, 136, 138, 140 and 146), reflectors 344 and 348 (respectively similar to reflectors 144 and 148), and a partially transmissive partially reflective optical part 312 (similar to partially transmissive partially reflective optical part 112). Further shown is eye 14 of user 10 (either 14R or 14L) and two distant objects 392A and 392B distanced from the optical display system 300 and user 10. In addition, optical display system 300 includes a fast focusing mechanism 360 and a dedicated processor 362 configured to be coupled therewith. Fast focusing mechanism 360 is configured and operative to change the projected image such that it is focused at a distance matching the external scenery (represented by objects 392A and 392B). In an alternative configuration, dedicated processor 362 is omitted, an instead, optical display system 300 employs a processor 314 (not shown) common to other computational functions of optical display system 300.

Image generator 330 is configured and operative to irradiate and project light encoded with information (e.g., an image) whose light beams associated therewith are directed onto a pupil 190 of the user's eye 14R, L. Nose-positioned reflector 348 ("exit mirror"), which is configured to be located at the side of the upper portion of nose 16 of user 10 and coupled with a nosepiece (not shown), at eye-level, directs the projected image toward partially transmissive partially reflective optical part 312 (e.g., semi-transparent ellipsoidal glasses), which in turn are configured to reflect at least part of the light beams (the image) back toward to user's eye, about the Z direction of coordinate system 388 coaxially aligned with the user's line of sight (LOS) 394, observing distant objects 392A and 392B ("scenery").

Optical display system 300 employs fast focusing mechanism 360 that is coupled with image generator 330, and that enables the projected image to be focused in a manner that matches a distance between eye 14 (R, L) of user 10 and an object 392A or a differently distanced object 392B. An example realization of fast focusing mechanism 360 is one that is configured to generate projected images each focused at multiple and different focusing positions. In the example shown in FIG. 10 the projected images are each focused at different focusing positions corresponding to the distances between eye 14(R, L) and viewed objects 392A and 392B. According to the disclosed technique, for an image (e.g., an image frame) to be projected in a superimposed manner over external scenery (objects 392A, 392B), processor 362 is configured and operative to analyze that image and determine the required projection focus distance per entity within that image. Processor 362 then splits the image into two image layers 370A and 370B, and transfers the two image layers sequentially to image generator 330 synchronously with the operation of fast focusing mechanism 360 between two focus positions 372A and 372B. Focus position 372A corresponds to image layer 370A and object 394A. Focus position 372B corresponds to image layer 370B and object 394B.

Implementation of a high rate dynamic focus adjustment of fast focusing mechanism 360 allows small corrections to the position of image generator 330 with respect to the lenses of electro-optical unit 104. The position of image generator 330 with respect to the lenses of electro-optical unit 104 determines the focal distance of the image that is projected to the left and right eyes of the user (e.g. the distance at which the objects are seen projected by the display). Focus adjustments are implemented via electromechanical methods. Alternatively, focus adjustments are implemented by using other methods, such as by moving at least one lens of electro-optical unit 104, by electrically changing the curvature of a lens using a fluid lens (e.g., via electrowetting-on-dielectric (EWOD)), and the like.

According to a binocular realization of the present embodiment of the disclosed technique, the position of image generator 330 is changed, for example, at a rate of 120 Hz. The binocular realization includes two separate image generators, one for each eye (i.e., a "left image generator" and a "right image generator"), such that each image generator is coupled with a light projection unit having a separate high rate dynamic focus correction mechanism. Processor 362 analyzes each image frame (containing graphical information) to be projected by each one of the left and right image generators and separates the image frame into at least two layers according to the distance of the objects in the scene. In other words, given two differently distanced objects with respect to optical display system 200, and an image to be projected onto partially transmissive partially reflective optical part 212, processor 362 is configured to (1) analyze data pertaining to the image to be projected with respect to the distances of the objects in the scene, and (2) separate the image features in the image into two layers, such that these image features are respectively displayed in focus with respect to and in a superimposed manner with the two distant objects. Generally, given two clusters of objects differing in focus distance, near and far, the graphical information contained in the projected image relating to the near cluster of objects are focused to an average near focusing distance, while graphical information relating to far objects are focused to an average far focusing distance. Optical display system 200 may optionally further include a depth sensing camera (not shown, e.g., ranging camera, stereo camera, etc.), a geo-location determination position and orientation subsystem (not shown), and the like that are configured and operative to determine the distance of external objects with respect to optical display system 200 (i.e., distance data) and to provide this distance data to processor 362. Processor 362 directs image generator 330 to generate the image layers sequentially and synchronously with the operation of focus mechanism 360, which in turn adjusts the position of image generator 330 to match an averaged distance of each of the image layers to be seen by user. By using this technique, separately for each left and right eye (i.e., in the binocular configuration) an image is generated with two distinct focal distances for the same image frame (e.g., in a sequence of images, i.e., video). Image generator 330 is capable of displaying images having high frame rates. For example, image generator 330 generates a display frame rate of 240 Hz, while fast focusing mechanism 360 also has a focus correction rate of 240 Hz, separately for each left and right eye. Accordingly, a perceived image by the user may have four distinct focal distances within each of the same image frame in the video.

Figure 11:
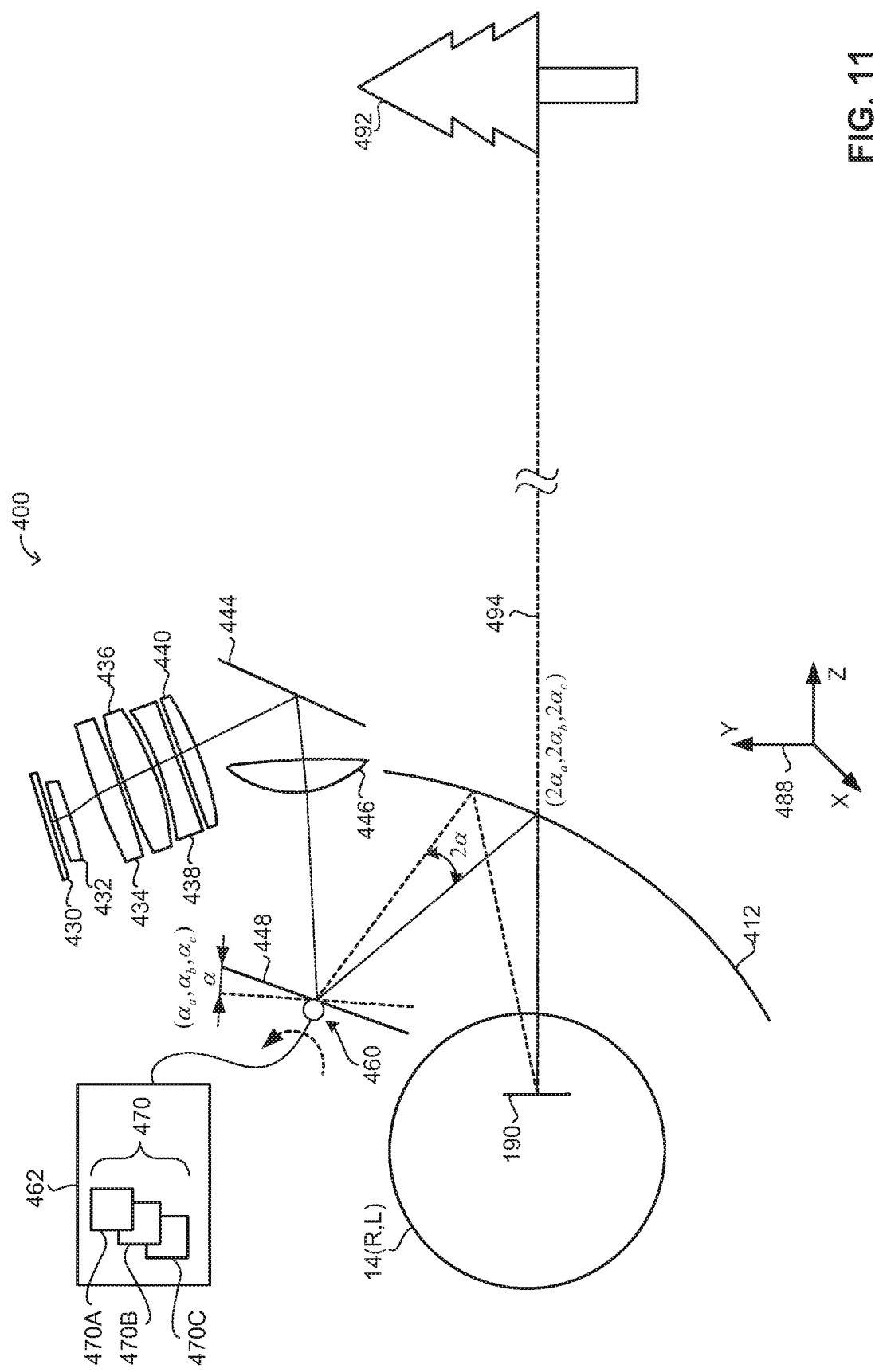
FIG. 11 is a schematic illustration of an optical display system, constructed and operative in accordance with another embodiment of the disclosed technique.

Reference is now made to FIG. 11, which is a schematic illustration of an optical display system, generally referenced 400, constructed and operative in accordance with another embodiment of the disclosed technique. FIG. 11 shows optical display system 400 including a variable folding angle (e.g., a tilt-able) nose-positioned reflector configuration that enables the adjustment of the FOV. According to the present embodiment of the disclosed technique, optical display system 400 enables modification in the orientation (tilting position) of left and right nose-positioned reflectors (e.g., 248L and 248R in FIG. 9), in order to change the angle at which each of the left and right projection channels is projected respectively toward the left and right eyes of the user, thus changing the resultant position of the optical exit pupil as well as the angle of each of the projected field of view at the eye of the user. Consequently, the effect achieved involves a change to a size of an FOV overlapping region (right and left FOVs). For example, changing the tilt angles for each of left and right nose-positioned reflectors by an angle α in one direction would cause a corresponding change of 2a in the opposite direction for light beams reflecting back from the partially transmissive partially reflective optical part, thus changing the overlapping region by 4a as well as the overall field of view by 4a.

In particular, optical display system 400 includes an image generator 430 (similar to image generator 130), lenses 432, 434, 436, 438, 440 and 446 (respectively similar to lenses 132, 134, 136, 138, 140 and 146), reflectors 444 and 448 (respectively similar to reflectors 144 and 148), and a partially transmissive partially reflective optical part 412 (similar to partially transmissive partially reflective optical part 112). Further shown is eye 14 of user 10 (either 14R or 14L) and a distant object 492 distanced from the optical display system 400 and user 10. In addition, optical display system 400 further includes a variable reflector folding angle mechanism 460 and a dedicated processor 462 configured to be coupled therewith. Variable reflector folding angle mechanism 460 is coupled with tilt-able nose-positioned reflector 448, and is configured and operative to change a folding angle (also denoted interchangeably as "tilt angle", "tilting position" and "tilting orientation") of tilt-able nose-positioned reflector 448. In an alternative configuration (not shown), dedicated processor 362 is omitted, an instead, optical display system 400 employs a processor 414 (not shown, but similar to processor 114) common to other computational functions of optical display system 400.

Image generator 430 is configured and operative to irradiate and project light encoded with information (e.g., an image) whose light beams associated therewith are directed onto a pupil 190 of the user's eye 14R, L. Tilt-able nose-positioned reflector 448 ("exit mirror"), which is configured to be located at the side of the upper portion of nose 16 of user 10 and coupled with a nosepiece (not shown), at eye-level, directs the projected image toward the partially transmissive partially reflective optical part 412 (e.g., semi-transparent ellipsoidal glasses), which in turn are configured to reflect at least part of the light beams (the image) back toward to user's eye, about the Z direction of coordinate system 488 coaxially aligned with the user's line of sight (LOS) 494, observing distant object 492 ("scenery").

Variable reflector folding angle mechanism 460 is configured and operative to change a tilting angle of tilt-able nose-positioned reflector 448 by an angle α, consequently changing the angle at which the light beams are guided towards partially transmissive partially reflective optical part 412 by an angle 2α, and consequently changing the angle at which the light beams are reflected back toward the user's eye 14(R, L). This change causes a change in the position of the exit pupil of the projection optics of light projection unit 406 (similar to light projection unit 106), as well as the field of view as seen by the user. Processor 462 is configured to electromechanically control variable reflector folding angle mechanism 460 for operation at high movement and/or rotation speeds (e.g., frame rates in synchrony with the frame rate of the image generator 430). In case image generator 430 generates video images, for each (image) frame 470, processor 462 generates three image layers 470A, 470B, and 470C, each of which is associated with information related to a specific region within a field of view. Processor 462 is configured to transfer the generated image layers 470A, 470B, and 470C sequentially to image generator 430 and concurrently to direct variable reflector folding angle mechanism 460 to tilt tilt-able nose-positioned reflector 448 to corresponding tilt angles $α_a$, $α_b$ and $α_b$ consequently changing the projection angle of the projected image by $2α_a$, $2α_b$ and $2α_c$, such that each of each of image layers 470A, 470B, and 470C is seen by the user's eye 14 (R, L) at a correct angle. It may be appreciated that the disclosed technique may be operated at high frame rate, such that the perceived field of view is as wide as 180 degrees horizontally from side-to-side, and 120 degrees vertically from top-to-bottom (e.g., thus covering a wide-ranging FOR).

The disclosed technique provides capabilities for real-time interaction with multimedia information both visually, vocally, tactilely, and the like, by measuring the position and orientation of the user with respect to the scenery around that user. By design, the disclosed technique avoids introduction of any obstructions to the user's FOR. The disclosed technique is also applicable to the entertainment domain including but not limited to, 360° videos (i.e., where a user may look around and naturally see projected video (via electro-optical unit) as it was captured at any direction), three-dimensional (3-D) videos, virtual reality gaming (e.g., where a game is played in an isolated scenery environment), augmented reality gaming (e.g., where game entities are visually placed and located within the user's surrounding scenery). The disclosed technique may further be applicable to design applications (such as architectural, automotive, scientific, engineering, and industrial purposes) (e.g., by providing means for looking at 3-D models virtually placed within surrounding scenery from any angle), learning and medical applications (e.g., a medical professional viewing models of a patient, graphical data being presented superimposed on the patient, a student learning through augmented reality, etc.), and the like. The disclosed technique is particularly applicable in dynamic usage conditions such as indoor and outdoor situations enabling the user to interact with multimedia information, while being on-the-move and at myriad scene illumination levels ranging from a sunny day to nighttime dim lighting conditions. Memory 116 (FIG. 1B) is configured to store data relating to the multimedia, or any other data that is used to project light encoded with information onto the partially transmissive partially reflective optical part.

The disclosed technique includes at least one, typically several, modes of operation. According to one mode of operation of the disclosed technique, live video may be presented to the user where it is visually isolated from the scenery around him (e.g. a virtual reality mode). Communication module 120 (FIG. 1B) is configured and operative to receive external data (e.g., live video, auxiliary data, Internet retrieved data, etc.) and to relay the external data to processor 114 for processing. Processor 114 is configured to communicate at least part of data received from communication module 120 to electro-optical unit 104, which in turn is configured and operative to generate and project light encoded with at least a derivative of that information for viewing by the user. Analogously, according to another mode of operation of the disclosed technique, light encoded with information such as images and live video may be presented to the user where the video content is visually overlaid or superimposed over of the outwardly viewed scenery by the user (e.g., an augmented reality mode). According to a further mode of operation of the disclosed technique, a combined virtual and augmented reality modes is provided to the user such that the user's eyes remain focused at the scenery and undistracted. It may be appreciated that the disclosed technique may be used and applicable to the domains of gaming (such as quests, combat fighting, treasure hunting, etc.), 3-D designs (architectural, industrial, automotive), entertainment (3-D movies, live shows, etc.) where the user can experience live augmented reality superimposed naturally over the perceived near surroundings of the user, without the positioning of obstructions (e.g., displays, prisms, mirrors) to the user's field of regard. For example, in the entertainment and gaming domains, one can appreciate that one goal is to provide the user with virtual multimedia information (e.g., both visual and sound) that appears to the user as realistic as possible.

There are several matters that the disclosed technique takes into consideration in order to augment the realism quality provided to the user. The first matter concerns the size of the field of view displayed to the user. Typically, the center field of gaze is about 20-30 degrees in the horizontal direction. The near-peripheral vision is considered to be in the range between 50-60 degrees in the horizontal direction, beyond which it is considered to be peripheral vision. One can appreciate that watching a video with a wide field of view (e.g., 80 degrees) that encompasses peripheral vision, as perceived by the user is much more realistic than in the case of watching the same video through a display with a relatively narrow field of view, where the user is not capable of perceiving the video in his or her peripheral vision.

Another matter relates to the comfortability of the wearable optical display system when worn. Particularly when wearing the optical display system for a relatively long duration of time (e.g., more than half an hour), one can appreciate that a head worn device is required to be as light as possible, without any "hot spots" that introduces local pressure to the head, and to the center of gravity needs to be as close as possible to the center of mass of the head thus facilitating in minimizing neck muscle strains due to the loads and weight of the system.

Another matter relates to focusing. The focus distance is especially significant to information that is intended to being perceived by the user at distances of 10 meters and below. One can appreciate that objects at close proximity are perceived in terms of their three-dimensional position through human stereoscopic vision as well as in terms of focus adaptation of the eyes of the user, which means that objects that the brain recognizes as being positioned at a certain distance are expected to have matching focus, whereas in cases of mismatch, the brain may ignore (e.g., filter) such non-focused objects.

Optical display systems 100, 102, 200, 300 and 400 provide sufficient image brightness for images projected toward the user's eye(s), so as to produce adequate image contrast against the illumination intensity of external scenery as observed through the partially transmissive partially reflective optical part. One may appreciate that the image contrast of the projected imagery with respect to that of the external scenery is determined at least by the intensity of the display, the optical efficiency of the projection optics, the reflectivity of the partially transmissive partially reflective coating (mirror), as well as the absorptivity of the material(s) from which the partially transmissive partially reflective optical part is constructed. Moreover, it may be appreciated that usage of OLED technology, which switches on only the required pixels within an image, enables elimination of the background haze effect usually exhibited in various prior art see-through display systems that make use of liquid crystal display (LCD) related technologies that are based on backlight.

The user attachment section typically houses at least one power supply (e.g., a rechargeable battery) to power the optical display system. The user attachment section may include temple portions (or stems) that are configured to detachably couple and engage with the head of the user (e.g., at the temple area, ears, etc.). The stems may incorporate the user interface that may be embodied as a human-machine-interface (HMI) device that enables the user to control and manipulate the system functions using the fingers, voice, etc. For example, the HMI device may be in the form of buttons, optical mouse, touch pad, and the like. The optical display system may further include a position and orientation (P&O) measurement subsystem (not shown), coupled with the processor, and which is configured and operative to continuously measure a position of the wearable optical display system (i.e., and a user who wears it), and the orientation of a line-of-sight of a user (e.g. the orientation of the head of the user, gaze direction, etc.). Such a P&O subsystem may be based on a miniaturized inertial measurement unit (IMU) constructed for example with MEMS (micro-electromechanical system) technology having various types of sensors. For example, the IMU is configured to measure 9 degrees of freedom (DOF) of three different physical properties (e.g. 3 DOF in magnetic field sensing (via a tri-axis magnetic field sensor), 3 DOF in acceleration sensing (via a tri-axis accelerometer), 3 DOF of angular velocity sensing (via a tri-axis gyroscope)) to measure the orientation of the head of the user, and a global position of the optical display system (e.g., via a global navigation satellite system, such as the global positioning system (GPS)) for position measurement. The optical display system may also include a camera (not shown, and enabled for communicatively coupling with the processor), which may be used during indoor operation, for the purpose of position and orientation measurement. The processor, configured and operative for receiving the images from the camera, employs at least one processing method such one based on repetitive image correlation and tracking for continuous mapping and localization of the camera with respect to near-field objects as observed in the immediate environment of the user hemmed in by the indoor surrounding scenery. Processing methods include, for example, SLAM (simultaneously learning and mapping) also known as PTAM (parallel tracking and mapping). One can appreciate that the optical display system determines orientation by measurements that may be performed at a high rate (e.g., 100 Hz, 200 Hz), combined with a high frame rate capable image generator (e.g. 120 Hz refresh frame rate), in order to achieve low latency. The disclosed technique employs low latency techniques (via its hardware (e.g., image generator, processor) and software (e.g., via the processor) as required in order to minimize motion sickness effects, dizziness, etc. A person skilled in the art, may appreciate that the optical display system of the disclosed technique achieves a perceived latency lower than 17 milliseconds from a time the head moves to a time where the display reacts and modifies the image so as to stabilize the presented (projected) information (e.g., image information) over the external scenery.

According to the disclosed technique, the structure of the near-eye display system enables a compact and conformal design with the structure of eyeglasses. Moreover, the mechanical design does not introduce obstructions to the user's field of regard. According to one aspect of the disclosed technique, the light projection unit includes two optical exit pupils (i.e., a left exit pupil and right exit pupil) which project separate imagery to each of the eyes of the user (left eye and right eye, respectively). According to this aspect, exit mirrors are positioned on both sides of the upper portion of the nose, at eye-level. Through each of the left and right exit pupils, a field of view of 60 degrees in the horizontal direction and 35 degrees vertical direction is projected to each left and right eyes of the user respectively and separately, where the two fields of views partially overlap with respect to each other. The optical display systems of the disclosed technique attain a horizontal overlap region is approximately 30 degrees of the field of view centered about the center field of regard. Each of the left and right optical exit pupils' field of views is centered about 10 degrees horizontally outward from the center field of regard, and thus the combination of the left and right field of views yield in a central region of 30 degrees with full overlap between the two fields of view. For each eye an additional 20 degrees of field of view is provided, thus the total perceived field of view delivered by the optical display system becomes 70 degrees in the horizontal direction and approximately 30 degrees in the vertical direction. According to another realization of the optical display systems of the disclosed technique, 30 degrees may be centered 5 degrees in a downward vertical direction from the center field of regard, resulting in 10 degrees of upward and 20 degrees of downward shift from the center field of regard.

According to another aspect of the disclosed technique, the partially transmissive partially reflective optical part includes an electronic shutter (not shown), which is able to rapidly switch the transparency between an "open mode" (i.e., transparent) and a "closed mode" (i.e., opaque). The processor (e.g., processor 114 is configured to run an application (e.g., a gaming application), that commands the electronic shutter (e.g., a switching mechanism) to operate in a synchronous manner with respect to external queues (e.g., user input received from the user interface), or internal queues (e.g., within the running application). For example, the processor controls the electronic shutter to close and open according to the orientation or looking direction of the user. The electronic shutter enables the wearable optical display system to switch between open mode (i.e., augmented reality) and closed mode (i.e., virtual reality). Both open and closed modes may be combined to provide a user with a combination of virtual reality situations and augmented reality situations intermixed. For example, an indoor usage of the wearable optical display system may involve the presentation of augmented reality objects around the user's field of regard superimposed onto the external surrounding scenery, while maintaining the electronic shutter in open mode, whenever the user's head is oriented in a downward direction, and switching to closed mode whenever the user's head is oriented upwards, above a certain angle from the horizon (and vice-versa).

The invention claimed is:

1. A wearable optical display system comprising:
a user attachment section for detachably mounting said wearable optical display system to at least part of a head of a user;
a partially transmissive partially reflective optical part, at least partly coupled with said user attachment section, and configured to be facing at least one eye of said user; and
an electro-optical unit, at least part of which is coupled with at least one of said user attachment section and said partially transmissive partially reflective optical part, said electro-optical unit comprising:
a plurality of lenses;
a plurality of reflectors having at least one nose-positioned reflector being positioned at a side of a nose of said user, wherein an intermediate image forms along an optical path before and after said at least one nose-positioned reflector, such to allow an unobstructed field of regard (FOR) to said at least one eye; and
a light projection unit for projecting light beams onto said partially transmissive partially reflective optical part via said at least one nose-positioned reflector being interposed along said optical path between said light projection unit and partially transmissive partially reflective optical part, for viewing at least part of a projection of said light beams by said at least one eye.

2. The wearable optical display system of claim 1, wherein said at least one nose-positioned reflector is configured at eye-level position, wherein said at least one nose-positioned reflector does not obstruct said FOR of said at least one eye of said user.

3. The wearable optical display system of claim 1, further including a nosepiece configured to support said at least one nose-positioned reflector, said nosepiece is further configured to couple with at least one of said user attachment section and said partially transmissive partially reflective optical part.

4. The wearable optical display system of claim 1, characterized as being an off-axis optical system in a horizontal direction, and an on-axis optical system in a vertical direction.

5. The wearable optical display system of claim 1, wherein said partially transmissive partially reflective optical part is ellipsoidal, having at least two foci at least one focus of which is configured to coincide with a position of said at least one eye.

6. The wearable optical display system of claim 1, wherein said optical projection unit is constructed and configured to fit within a space above a nose of said user, and on both upper sides of said nose, including a glabellar region of said user.

7. The wearable optical display system of claim 1, wherein said partially transmissive partially reflective optical part includes a user-facing surface configured to face said user, and an outward-facing surface configured to face an outward-facing environment to said user, said partially transmissive partially reflective optical part enables at least partial reflection of said light beams impinging on said user-facing surface, and further and concurrently allowing at least partial transmission therethrough of incoming light from said outward-facing environment wherein said partially transmissive partially reflective optical part is constructed as a single continuous surface with regard to at least one of said user-facing surface, and said outward-facing surface, wherein said partially transmissive partially reflective optical part is constructed as a single continuous surface with regard to at least one of said user-facing surface, and said outward-facing surface.

8. The wearable optical display system of claim 1, wherein said at least one nose-positioned reflector is selected from a list consisting of:
   a flat front surface mirror;
   a flat back surface mirror;
   a curved front surface mirror;
   a curved back surface mirror;
   a prism;
   a micro-mirror array;
   a wedge mirror;
   a polarizing wedge mirror;
   characterized by a spherical component;
   characterized by an elliptical component;
   characterized by an axis component;
   characterized by a polarization; and
   characterized by photochromic attributes.

9. The wearable optical display system of claim 1, wherein said partially transmissive partially reflective optical part is constructed to exhibit at least one optical property selected from a list consisting of:
   a photochromic property;
   an antireflection property;
   an anti-abrasion property;
   an anti-fogging property;
   an oleophobic property;
   a light polarization property;
   an optical power property;
   a particular interpupilary distance;
   a polychromatic property; and
   transparency to light in at least one range of light wavelengths;
   opacity to light in at least one range of light wavelengths;
   totally transparent;
   totally opaque; and
   partly transparent on a portion thereof, while opaque on a complementary portion of said portion.

10. The wearable optical display system of claim 1, wherein said nose-positioned reflector includes a plurality of nose-positioned reflectors that are configured to assume at least one arrangement selected from a list consisting of:
   are mechanically coupled with each other;
   at least two said nose-positioned reflectors are contiguous to each other;
   all of said nose-positioned reflectors are contiguous to each other;
   at least two said nose-positioned reflectors are positioned separate from each other;
   all of said nose-positioned reflectors are separate from each other;
   are positioned at various vertical and horizontal positions along said side of said nose; and
   at least two said nose-positioned reflectors are oriented at an angle with respect to each other.

11. The wearable optical display system of claim 1, wherein said electro-optical unit further includes an image generator, configured to generate and irradiate said light beams, wherein said lenses include:
   a first lens;
   a second lens;
   a third lens;
   a fourth lens; and
   a fifth lens;
   wherein said reflectors further include:
   a second reflector;
   wherein said image generator, said at least one nose-positioned reflector, said second reflector, said first lens, said second lens, said third lens, said fourth lens, and said fifth lens are in fixed positions with respect to each other, so as to allow said light beams to travel an optical path through said fifth lens, said forth lens, said third lens, said second lens, then to reflect from said second reflector, then through said first lens, then reflect from said at least one nose-positioned reflector, and then to reflect from said partially transmissive partially reflective optical part toward said at least one eye of said user.

12. The wearable optical display system of claim 1, wherein said wearable optical display system is configured in a binocular optical configuration wherein said lenses and said reflectors define a first optical channel associated with one said at least one eye, said binocular optical configuration further including a second set of said lenses and a second set of said reflectors that define a second optical channel associated with a second said eye of said at least one eye of said user, wherein said light projection unit is common to both said first optical channel and said second optical channel, wherein a second nose-positioned reflector of said second set of reflectors is positioned opposite to said side of said nose of said user.

13. The wearable optical display system of claim 1, wherein said wearable optical display system is configured in a binocular optical configuration wherein said lenses and said reflectors define a first optical channel associated with one said at least one eye, said binocular optical configuration further including a second said light projection unit, a second set of said lenses and a second set of said reflectors that define a second optical channel associated with a second said eye of said at least one eye of said user.

14. The wearable optical display system of claim 13, wherein said light projection unit and said second light projection unit are configured to project three-dimensional (3-D) images in a mutual overlapping region in a field of vision covered by two of said at least one eye.

15. The wearable optical display system of claim 1, further comprising a processor, and a focusing mechanism, said processor configured to communicate data with said light projection unit, said focusing mechanism configured to be coupled with said processor, said focusing mechanism is configured to change a focusing distance of projected said light beams such that they are focused at a distance matching external scenery.

16. The wearable optical display system of claim 15, wherein said processor is further configured to analyze an image to be projected by said electro-optical unit, to determine a projection focus distance per entity within said image to be projected, to split said image to be projected into a plurality of layers according to said projection focus distance per said entity, and to direct said focusing mechanism to focus between said a plurality of focusing positions that respectively correspond with each of said projection focus distance per said entity.

17. The wearable optical display system of claim 1, wherein said wearable optical display system further includes a shutter mechanism that enables a transparent mode in which said partially transmissive partially reflective optical part is transparent to said user, and an opaque mode in which said partially transmissive partially reflective optical part is opaque to said user.

* * * * *